United States Patent [19]

Sato et al.

[11] Patent Number: 5,585,960
[45] Date of Patent: Dec. 17, 1996

[54] SPATIAL LIGHT MODULATING APPARATUS TO DISPLAY STEREOSCOPIC IMAGE

[75] Inventors: Noriko Sato; Hirokazu Aritake; Masayuki Kato; Manabu Ishimoto, all of Kawasaki, Japan

[73] Assignee: Fujitsu Limited, Kawasaki, Japan

[21] Appl. No.: 373,791

[22] Filed: Jan. 17, 1995

[30]  Foreign Application Priority Data

Jan. 25, 1994  [JP]  Japan .................................. 6-006289

[51] Int. Cl.$^6$ .................................................. G02B 26/00
[52] U.S. Cl. ........................... 359/290; 359/223; 359/850
[58] Field of Search .................................. 359/223, 224, 359/230, 290, 291, 292, 850, 851

[56]  References Cited

U.S. PATENT DOCUMENTS

| | | | |
|---|---|---|---|
| 5,151,718 | 9/1992 | Nelson | 346/160 |
| 5,170,269 | 12/1992 | Lin et al. | 359/9 |
| 5,369,433 | 11/1994 | Baldwin et al. | 348/207 |

OTHER PUBLICATIONS

Optics Letters/vol. 13, No. 1, Jan. 1988, pp. 10–12, "Optical characteristics of a deformable–mirror spatial light modulator."

Primary Examiner—Georgia Y. Epps
Assistant Examiner—Dawn-Marie Bey
Attorney, Agent, or Firm—Staas & Halsey

[57]  ABSTRACT

A spatial light modulating apparatus to display a steroscopic image constructed by a light source section, a mirror section, and a light deflecting section. The device structures are two-dimensionally arranged on a substrate surface. The light source sections are 2-dimensionally arranged on the apparatus substrate at a predetermined period interval (P) and modulate a light intensity by an external signal, thereby displaying an image. The reflecting surfaces of the mirror sections are periodically arranged in correspondence to the light source sections. The mirror sections change the direction of each of the reflecting surfaces by an external signal, thereby angle modulating the incident light. Further, the light deflecting sections are arranged in the upper portion in the light emitting direction from the plurality of light source sections and allow the lights emitted from the light source sections to enter the corresponding mirror sections.

27 Claims, 30 Drawing Sheets

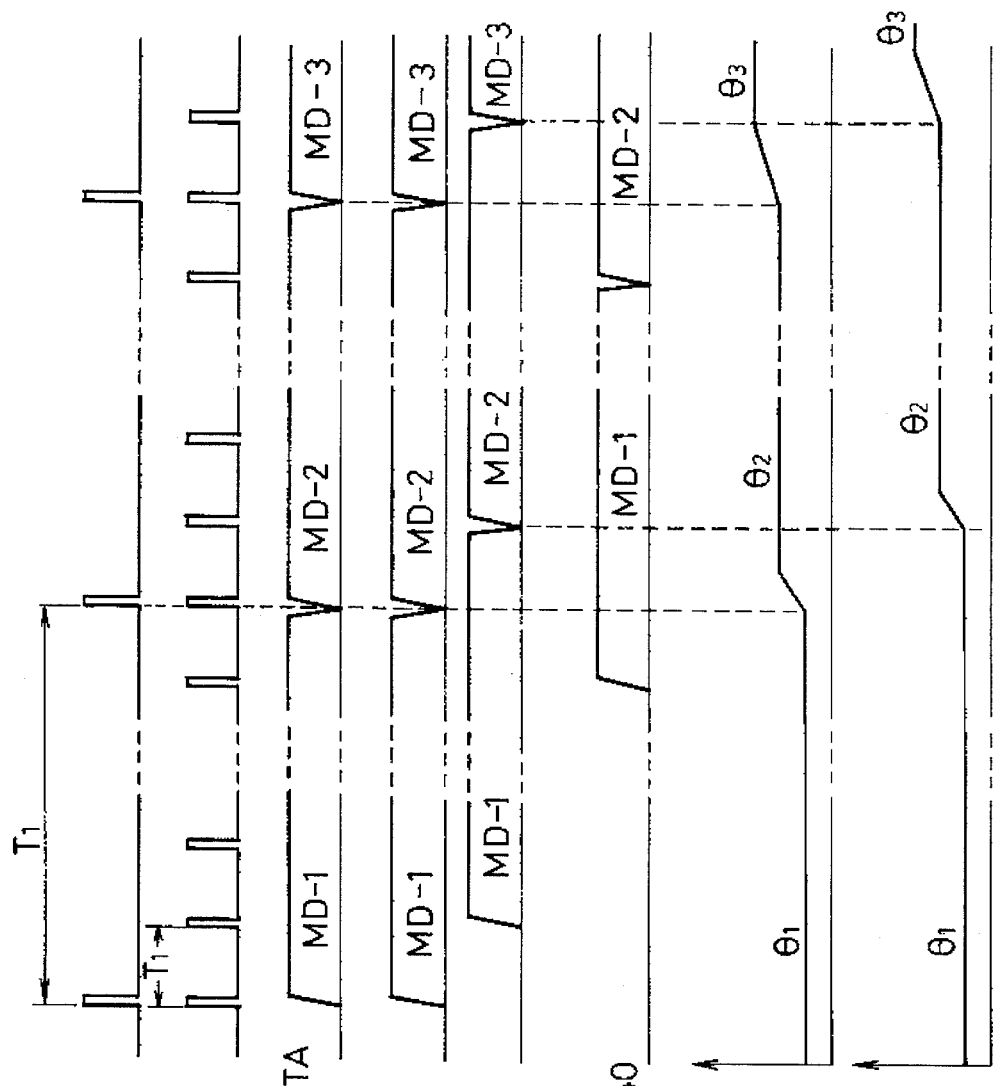

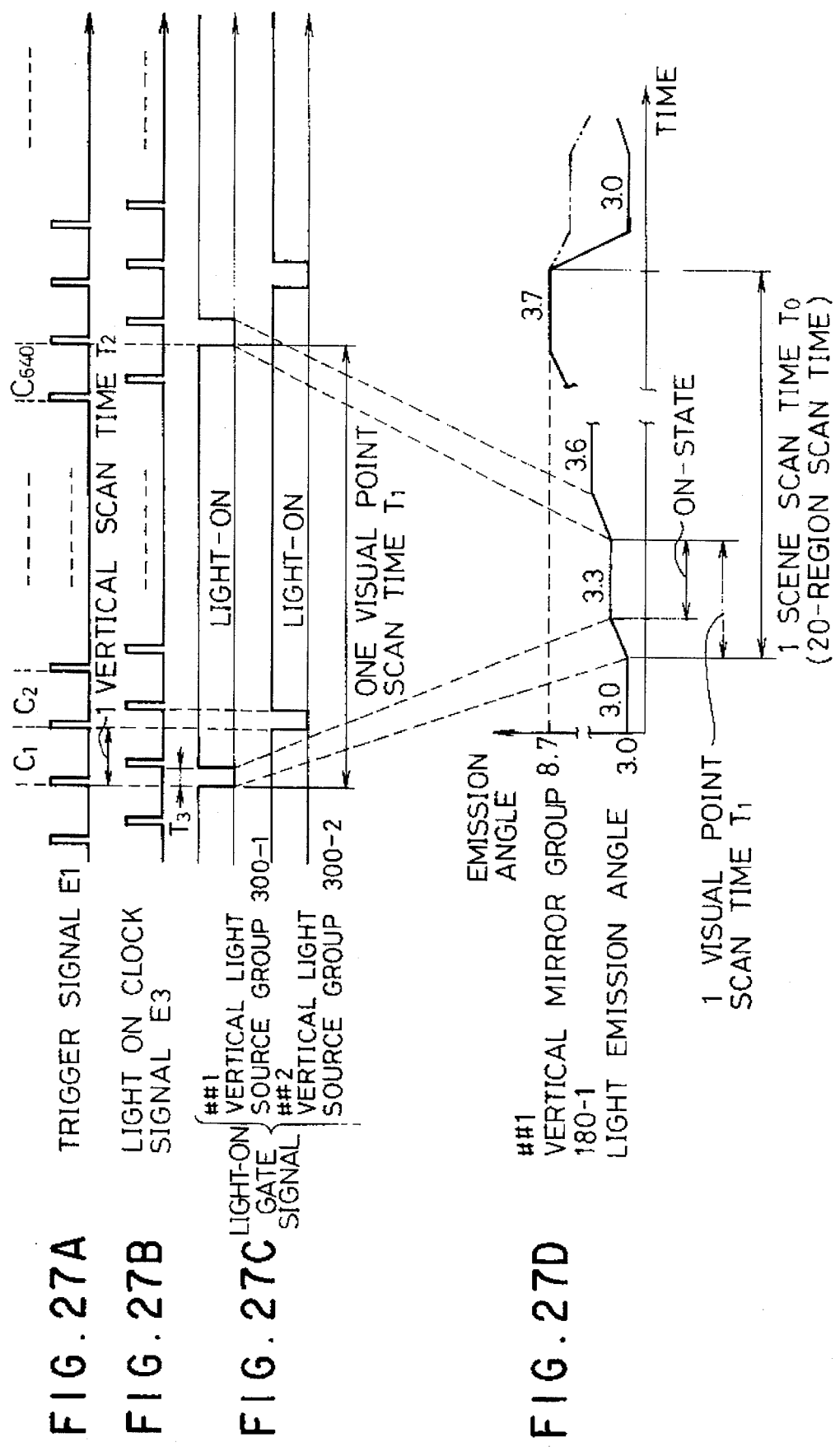

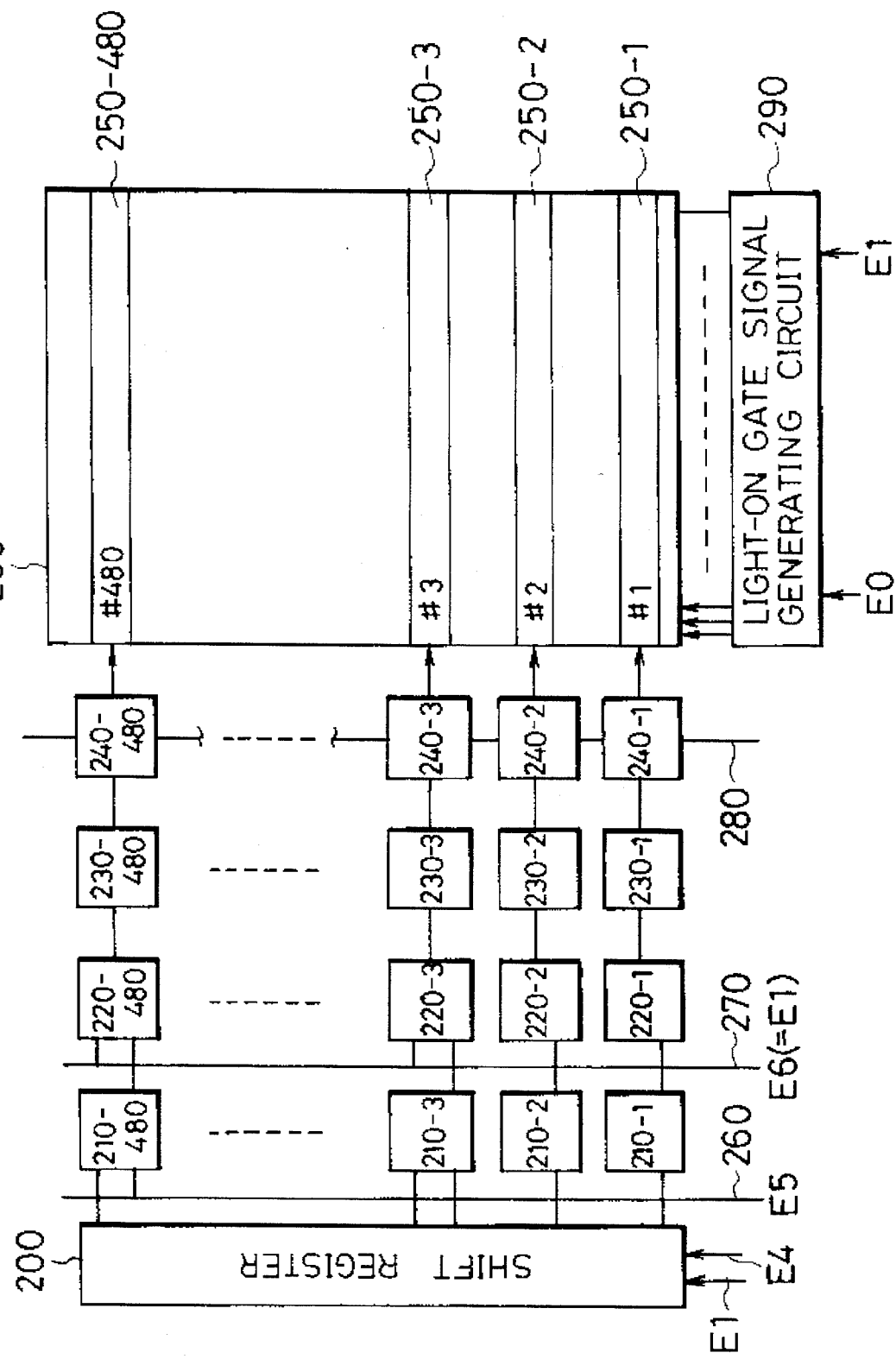

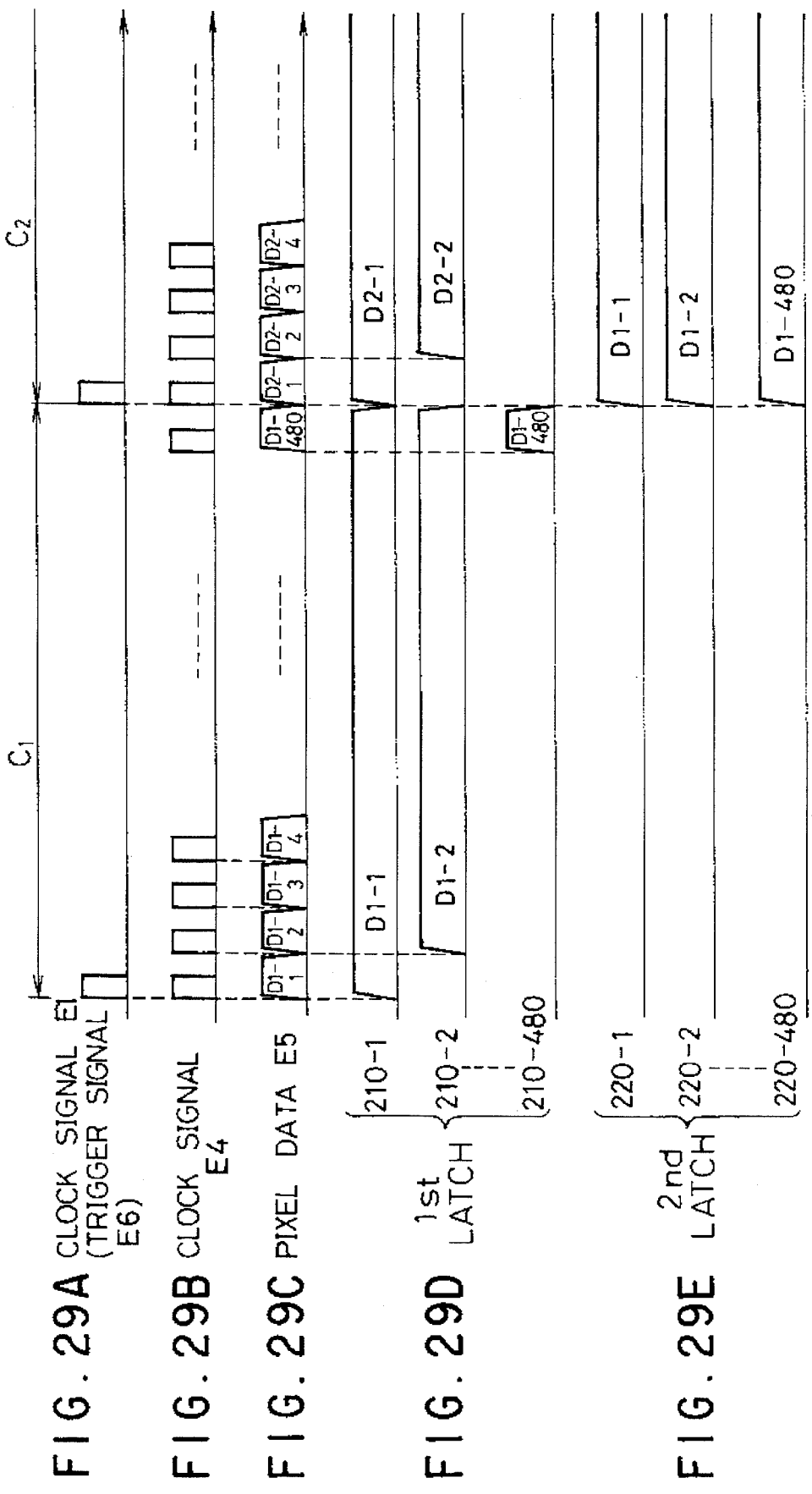

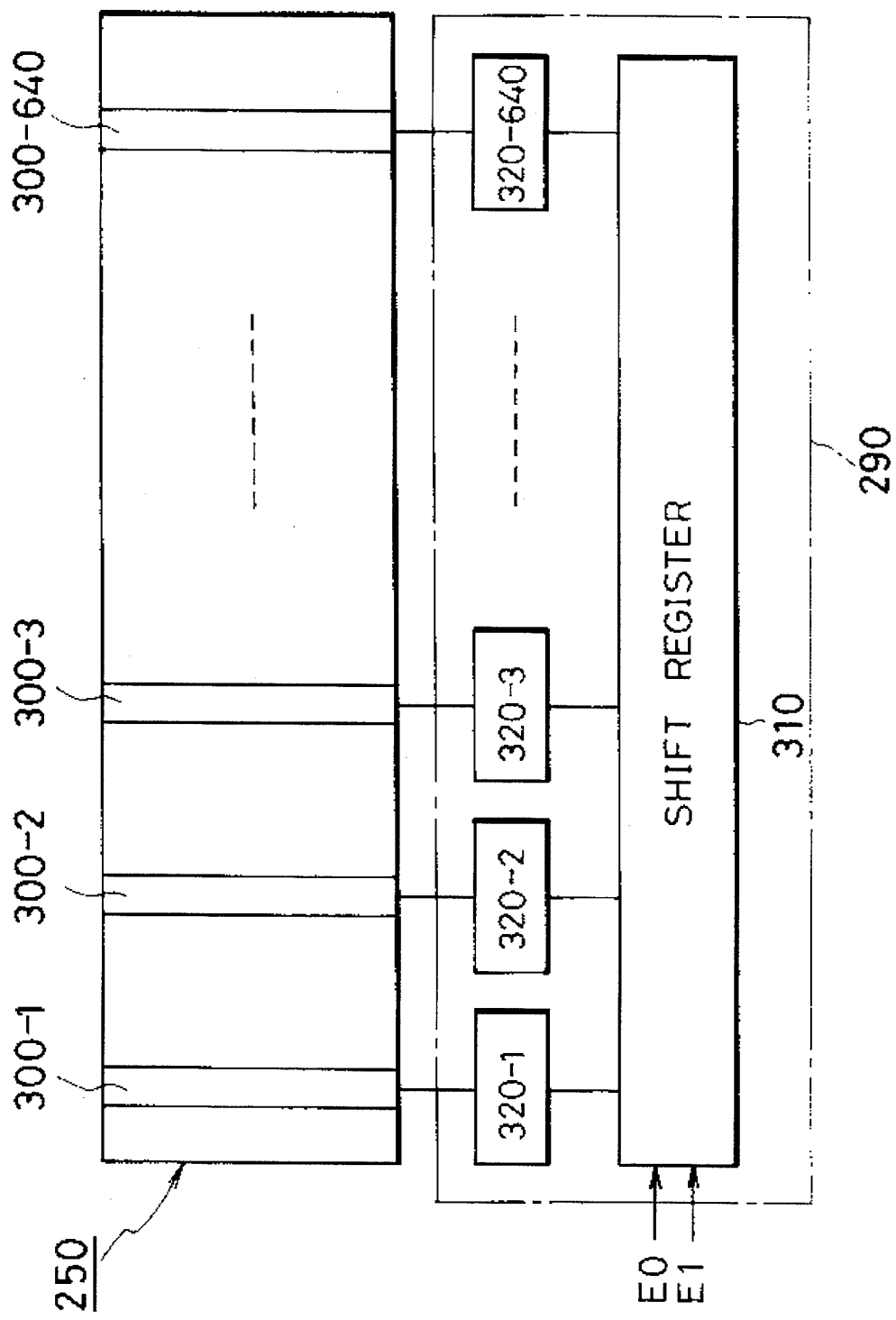

SPATIAL LIGHT MODULATING APPARATUS TO DISPLAY STEREOSCOPIC IMAGE

BACKGROUND OF THE INVENTION

1. Field of the Invention

The present invention relates to a spatial light modulating apparatus for displaying a plurality of two-dimensional images obtained by seeing a target object from different visual point positions, thereby allowing a stereoscopic image to be seen. More particularly, the invention relates to a spatial light modulating apparatus having a structure such that a number of pixel light sources for displaying the 2-dimensional image and mirror devices for deflection are integrated.

2. Description of the Related Art

Hitherto, various studies and developments of a display apparatus by which a stereoscopic image can be seen and recognized have been made. A conventional stereoscopic display apparatus is of a double-eye type which is represented by a spectacle type. Different video images are shown to the right and left eyes, thereby obtaining a stereoscopic feeling by a vergence of two eyes or a parallax of two eyes. As an extension of the double-eye type, there is an apparatus using a lenticular lens of a multieye type. The principle for allowing a stereoscopic image to be seen in such an apparatus is similar to that of the double-eye type and a video image of about eight eyes is obtained. However, a stereoscopic image can be seen only at a predetermined position. In such a conventional apparatus, since no difference (motion parallax) occurs in the stereoscopic image to be observed even when the observer moves his head to the right and left, only an unnatural stereoscopic image can be seen.

A holographic stereogram can be mentioned as an apparatus which can solve the above drawbacks. According to the holographic stereogram, a two-dimensional video image including a parallax is recorded in a slit-shaped segment holograms which is elongated in the vertical direction and a number of segment holograms are arranged in the horizontal direction. Therefore, even when the observer moves his head to the right and left, a natural stereoscopic feeling can be obtained. In case of electrically displaying the holographic stereogram, however, it is necessary to calculate a phase distribution every time the display image changes, so that there is a problem such that a calculation load is large.

As an apparatus to solve such a problem, the applicant of the present invention has proposed "Stereoscopic Display Apparatus" of U.S. patent Ser. No. 08/125,660 (filed on Sep. 23, 1993). The stereoscopic display apparatus comprises as shown in FIG. 1: a display 400 for displaying a 2-dimensional image; a deflection diffusing section 410 for deflecting a light emitted from each pixel of the display 400 in the horizontal direction, thereby diffusing; and further, a lenticular lens 420 which functions as a directional enlarging section for enlarging the light in the vertical direction. When stereoscopically displaying, a preset observation range 440 is divided into stripe-shaped visual point regions A1 to An each of which is long in the vertical direction and different 2-dimensional images which are obtained by seeing an object from the visual point regions are prepared. The 2-dimensional images are time-divisionally displayed by the display 400 and the deflection diffusing section 410 is driven, thereby deflecting a bundle of light beams from the 2-dimensional image to a corresponding visual point region. In the case, therefore, where eyes 450-1 and 450-2 of the observer are positioned, for example, at visual point regions A$i$ and A$i$+k, two 2-dimensional images which are differently seen are observed in the visual point regions and the stereoscopic feeling can be obtained. According to the stereoscopic display apparatus, a stereoscopic display which is equivalent to a holographic stereogram can be performed without calculating an enormous amount of phase distributions.

In order to realize the stereoscopic display apparatus of FIG. 1, a device in which modulating devices of the light intensity to display the pixels of the 2-dimensional image and devices for deflecting the lights from the pixels synchronously with the image display are two-dimensionally arranged is necessary. As such a device, for example, a device in which mirrors and light emitting devices are combined and 2-dimensionally arranged and the light whose intensity was modulated by the light emitting device is deflected by the mirror is considered. In the apparatus which has already been proposed, since a galvano mirror is used as a mirror, an area which is occupied by one pixel is large, so that the apparatus cannot be miniaturized. On the other hand, in the field of an optical computer or the like, studies of a device in which fine mirror devices are arranged in an array shape and which is known as a deformable mirror device (DMD) are being performed. In an LED or a semiconductor laser, a manufacturing method of a device in which the light emitting devices are arranged in an array shape is also being studied and a device in which a plurality of light emitting devices are arranged in an array shape has been manufactured. By combining such a DMD and a light emitting device, a small stereoscopic display apparatus can be realized.

In the case where the light which was intensity modulated by the light emitting device is angle modulated by the deformable mirror device, however, as shown in FIG. 2, it is necessary to install a light emitting device 510 at a high position over a mirror device 520 formed along a surface 540 of a circuit board 500. Therefore, a flat circuit board shape isn't obtained and it is difficult to integratedly manufacture the device in which the light emitting devices for light intensity modulation and the mirror devices for angle modulation are two-dimensionally arranged.

SUMMARY OF THE INVENTION

According to the invention, there is provided a spatial light modulating apparatus for allowing a stereoscopic image to be seen, wherein a device in which a light which was intensity modulated by light emitting devices which are periodically 2-dimensionally arranged is angle modulated by mirror devices which are periodically 2-dimensionally arranged can be easily realized by a flat shape.

According to a spatial light modulating apparatus of the invention, one device is constructed by a light source section, a mirror section, and a light deflecting section and such devices are 2-dimensionally arranged on the surface of a circuit board, thereby constructing a display device. The light source sections are 2-dimensionally arranged at a predetermined period interval (P) on the circuit board of the apparatus, to intensity modulate the light emitted by a signal inputted from the outside, and to display a 2-dimensional image. In the mirror sections, reflecting surfaces are periodically arranged in correspondence to the light source sections and the direction of each of the reflecting surfaces is changed by the signal from the outside, thereby angle modulating the incident light. Further, the light deflecting section is arranged in the upper portion in the light emitting direction from the plurality of light source sections and allows the light emitted from the light source section to enter the corresponding mirror section.

A plurality of light source sections can be also arranged for one mirror section. When it is now assumed that the total number of light source sections is set to the value which is an integer times (N) as large as the total number of mirror sections, the arrangement period in which (N) light source sections are combined as a set is equalized to the predetermined period interval (P) of the mirror sections. A plurality of light source sections can be also arranged in the direction perpendicular to the rotary shaft of the mirror section.

The light source section can have any one of a structure (side surface light emitting structure) in which the light is emitted in the direction along the light source arrangement surface and a structure (plane surface light emitting structure) in which the light is emitted in the direction perpendicular to the light source arrangement surface. Specifically, a semiconductor laser and a light emitting diode are used.

As a mirror section, a deformable mirror device which can be realized as an integrated device and which changes the direction of the reflecting surface by generating an electrostatic attracting force (Coulomb's force) according to the signal from the outside is used.

A diffraction grating is used as a light deflecting section. The diffraction grating has a diffraction structure such that the reflection light which is obtained when the reflecting surface of the mirror section is located at a neutral position that is parallel with the mirror arrangement surface is converged to a point at the observing position on the central axis line from the arrangement surface of the plurality of light source sections. Even if the mirror position differs, the diffraction grating can be deflected by the same signal by such a diffracting function. With respect to the diffraction gratings arranged in the vertical direction, therefore, they can be also regarded as one continuous diffraction grating as shown by alternate long and two short dashes lines.

Further, a light diffusing section to diffuse the lights in one direction is arranged at the front surfaces of the plurality of mirror sections provided for the display device. It is now assumed that the light diffusing section comprises a lenticular sheet in which a plurality of fine lenticular lenses are arranged or a hologram sheet in which a plurality of fine holograms each having a one-dimensional phase distribution are arranged.

In the invention, the display devices can be divided into an active device in which the light source sections and mirror sections are arranged on the same surface and a static device in which only the light deflecting section is arranged. According to the stereoscopic display apparatus of the invention, therefore, by arranging the static deflecting device such as a diffraction grating to a position over the light source device, the light from the light emitting device is deflected by the deflecting device and is allowed to enter the mirror device arranged at a neighboring position on the same plane and can be angle modulated. Thus, the active light emitting devices and mirror devices which are driven by the signal from the outside can be flatly arranged and formed on the same circuit board plane. Therefore, the device in which the light source device and mirror device are combined as a set and such sets are 2-dimensionally arranged can be easily realized by the integration structure. A small stereoscopic display apparatus of a high picture quality using a plurality of 2-dimensional images of different visual point positions can be manufactured.

The above and other objects, features, and advantages of the present invention will become more apparent from the following detailed description with reference to the drawings.

BRIEF DESCRIPTION OF THE DRAWINGS

FIGS. 26A to 26F are timing charts for the operations in one visual point scanning period in the mirror driving circuit in FIG. 25;

FIGS. 27A to 27D are timing charts for a light source lighting control and a mirror driving in one visual point scanning period in FIG. 25;

FIG. 28 is a block diagram of an embodiment of a light source driving circuit in FIG. 19;

FIGS. 29A to 29E are timing charts for the image display operation at every vertical line by the light source driving circuit in FIG. 28; and FIG. 30 is a block diagram of a light-on gate signal generating circuit in FIG. 28.

DETAILED DESCRIPTION OF THE PREFERRED EMBODIMENTS

Figure 1:
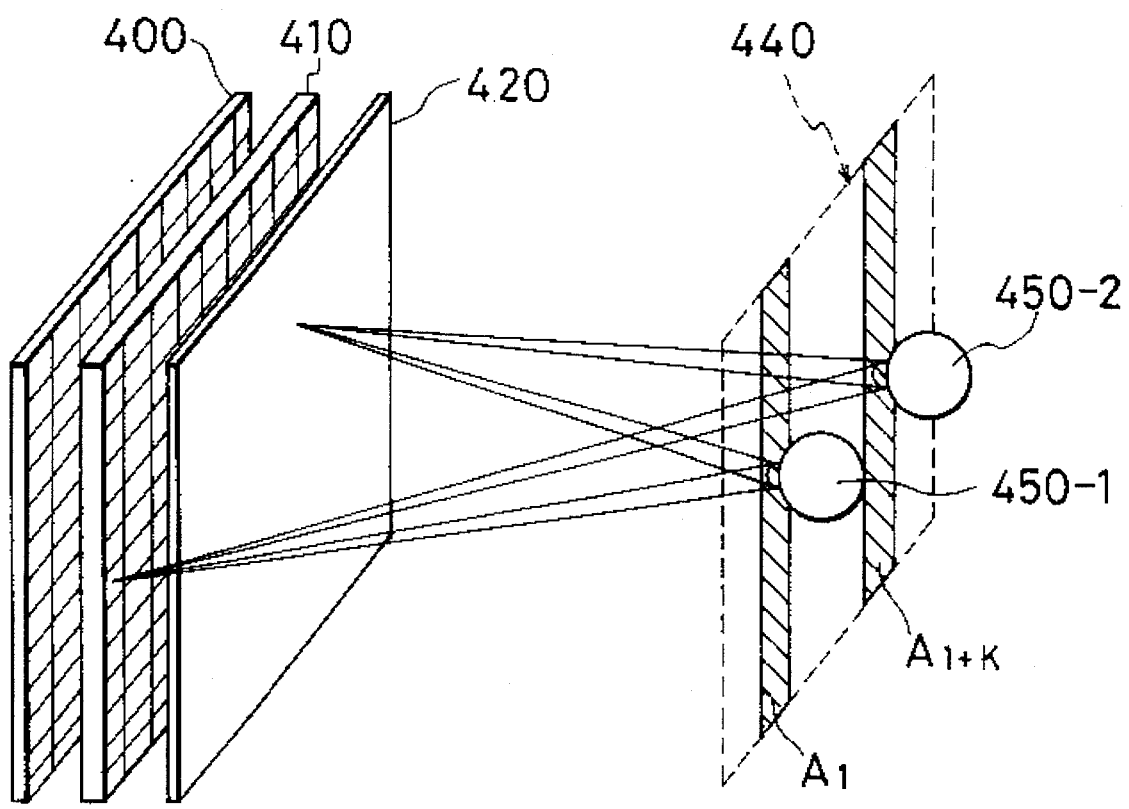
FIG. 1 is an explanatory diagram of a stereoscopic display apparatus which has already been proposed by the inventor of the present invention.
Figure 2:
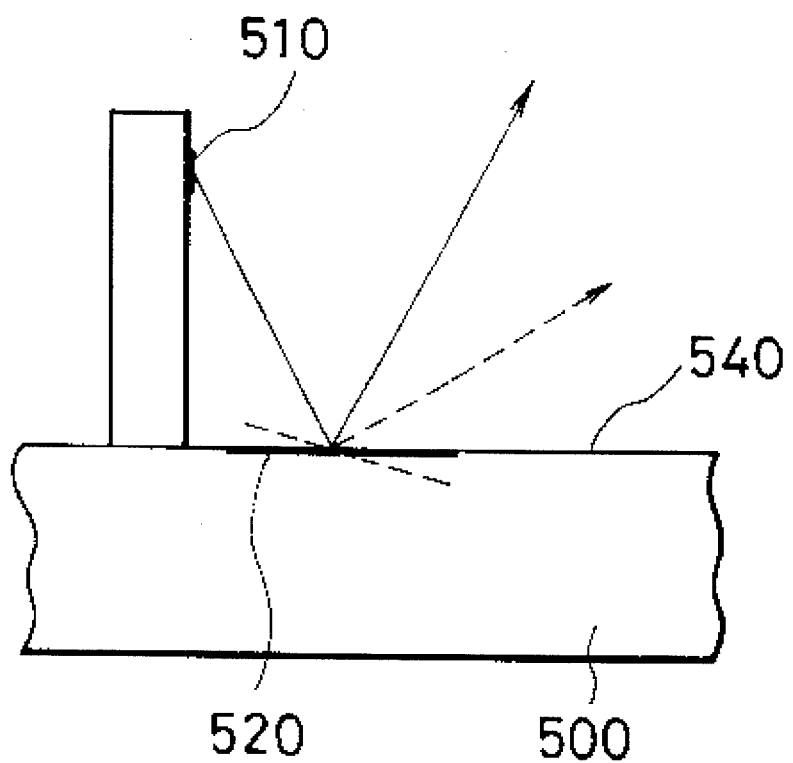
FIG. 2 is an explanatory diagram of structures of a light source device and a mirror device which is difficult to form a flat structure.
Figure 3:
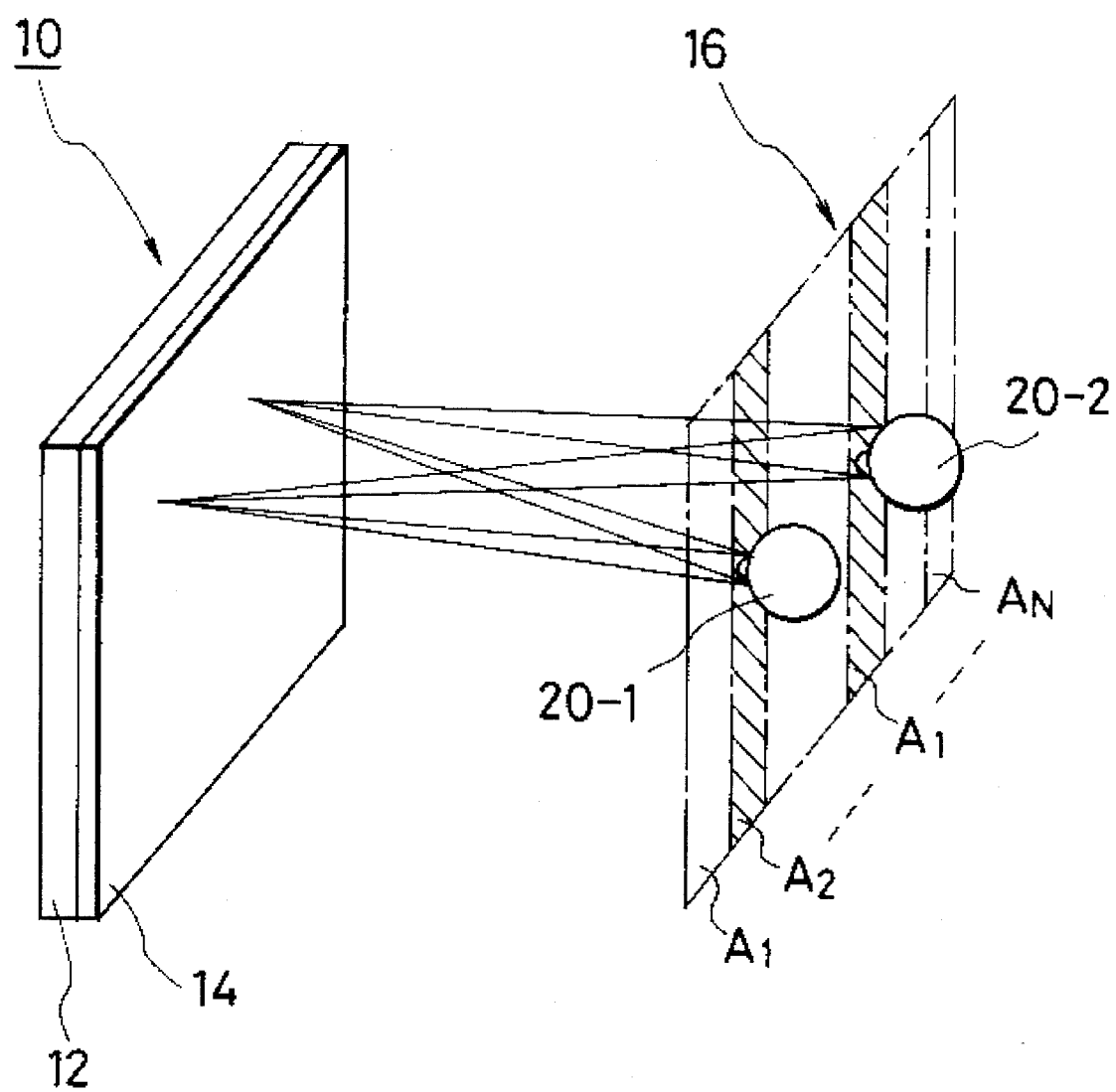
FIG. 3 is an explanatory diagram of a fundamental embodiment of the invention.

FIG. 3 shows a fundamental embodiment of a stereoscopic display apparatus of the invention. A stereoscopic display apparatus 10 comprises a display device 12 which operates as a spatial light modulating apparatus and a lenticular lens 14 to enlarge a light from the display device 12 in the vertical direction. A virtual observation range 16 is set at the position away from the display surface of the stereoscopic display apparatus 10 by a predetermined distance (L). The observation range 16 is divided into stripe-shaped visual point regions $A_1$ to $A_N$ which are elongated in the vertical direction. The display device 12 displays 2-dimensional images which are obtained when seeing an object by setting a visual point to each of the visual point regions $A_1$ to $A_N$. A bundle of light beams are deflected to a corresponding visual point region every display of each of the 2-dimensional images. In the case, therefore, where the observer sees the object by setting eyes 20-1 and 20-2, for example, into the visual point regions A$i$ and A$i$+k, those eyes see different 2-dimensional images. Thus, a stereoscopic display which is substantially equivalent to a holographic stereogram can be seen without displaying a phase distribution (interference fringe).

Figure 4:
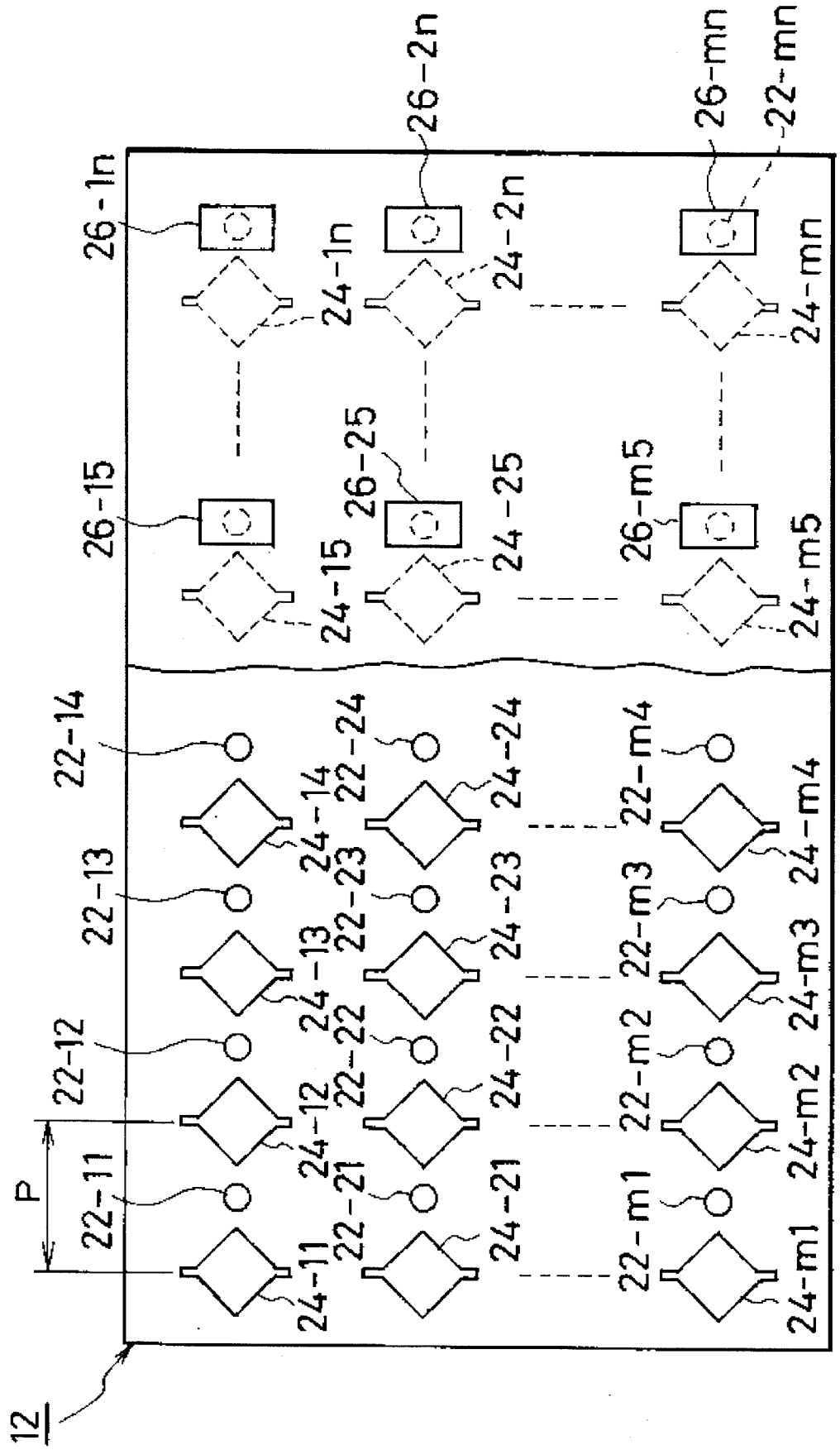
FIG. 4 is an explanatory diagram of the first embodiment of an arrangement of devices of the invention.

FIG. 4 shows an embodiment of the display device 12 in FIG. 3 with a part cut away. First, a plurality of mirrors 24-11 to 24-$mn$ are flatly arranged like an array in the display device 12. Light sources 22-11 to 22-$mn$ are arranged like an array on the right side of the mirrors 24-11 to 24-$mn$ in a one-to-one corresponding manner. Further, as shown in a non-cut portion on the right side, diffraction gratings 26-15 to 26-$mn$ which function as light deflecting sections are arranged at positions over the light sources provided in the display device 12. In this instance, the light sources 22-11 to 22-$mn$ are also arranged at the same predetermined period interval (P) as predetermined period interval the predetermined period interval (P) in the lateral (horizontal) direction of the mirrors 24-11 to 24-$mn$.

Figure 5:
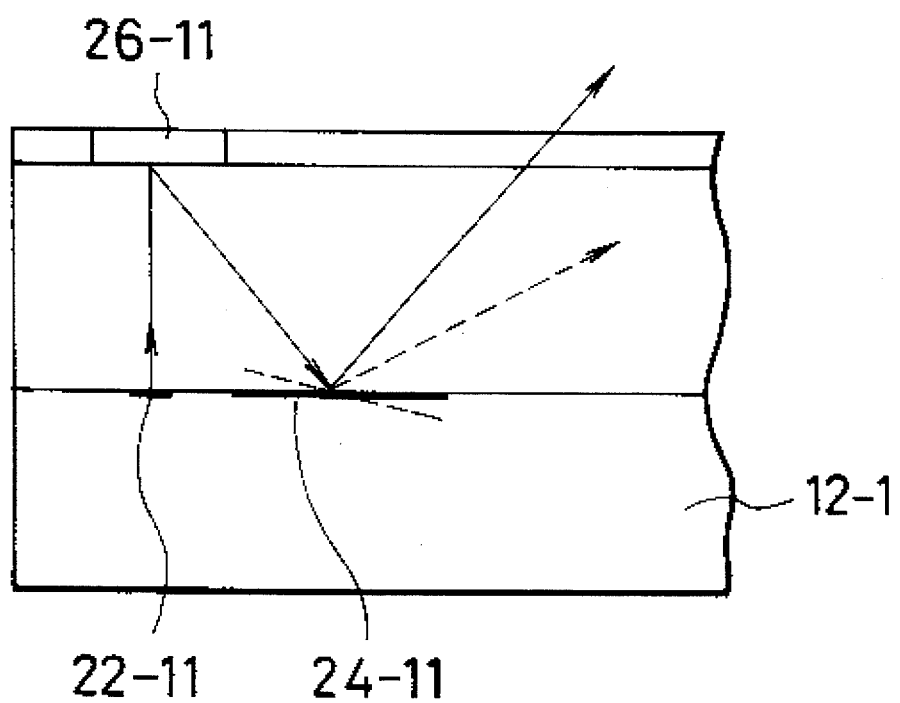
FIG. 5 is a schematic cross sectional view taken along the line III—III in FIG. 4.

FIG. 5 shows a schematic cross sectional structure of the portions of the mirror 24-11 and light source 22-11 at the left upper corner in FIG. 4. The light source 22-11 and mirror 24-11 are arranged on the same plane of a device substrate 12-1. A diffraction grating 26-11 functioning as a light deflecting section is arranged above the light source 22-11. The light emitted from the light source 22-11 is deflected by the diffraction grating 26-11 and enters the mirror 24-11. As will be described hereinlater, the mirror 24 can change its angle by a signal from the outside. That is, the mirror 24 performs an angle modulation such that the intensity of the light to be emitted is modulated by the light source 22-11 in accordance with the pixel signal from the outside and the light is allowed to enter the mirror 24-11 from the diffraction grating 26-11, thereby changing the deflecting direction. The predetermined period interval (P) of the plurality of mirrors 24-11 to 24-$mn$ is set so as to satisfy, for example, the following equation for the standard observation distance (L) from the observing position to the mirror surface.

$$\tan^{-1}(P/L) \leqq 0.3°$$

Although the diffraction gratings 26-11 to 26-$mn$ are independently formed in the embodiment, with respect to the diffraction gratings arranged in the vertical direction, since the angles of diffraction are equal as will be explained hereinlater, they can be also constructed as one continuous stripe-shaped diffraction grating. This point shall also apply to the other embodiments.

Figure 6:
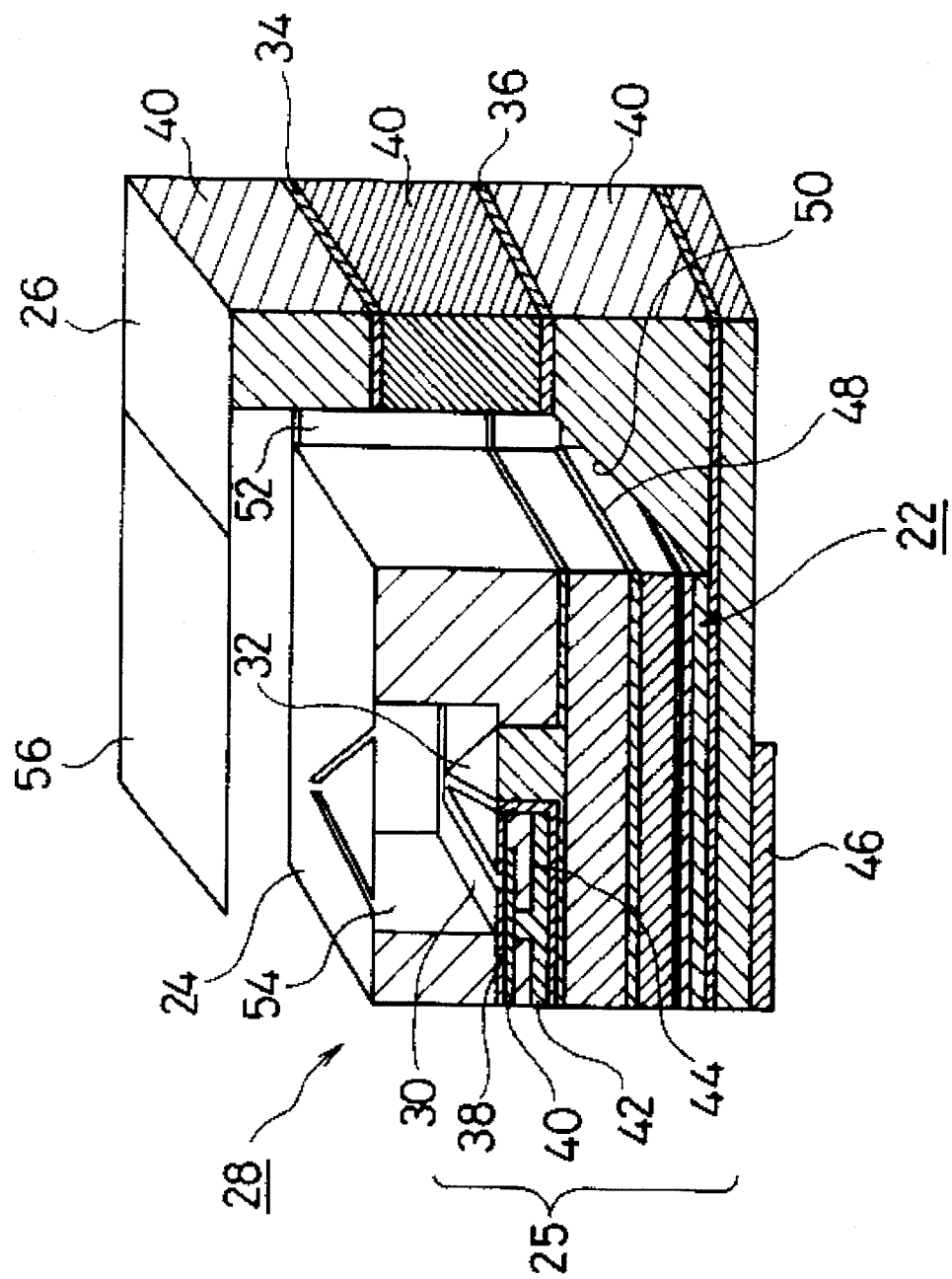
FIG. 6 is a stereoscopic cross sectional view of a detailed structure of one device in FIG. 4.
Figure 7:
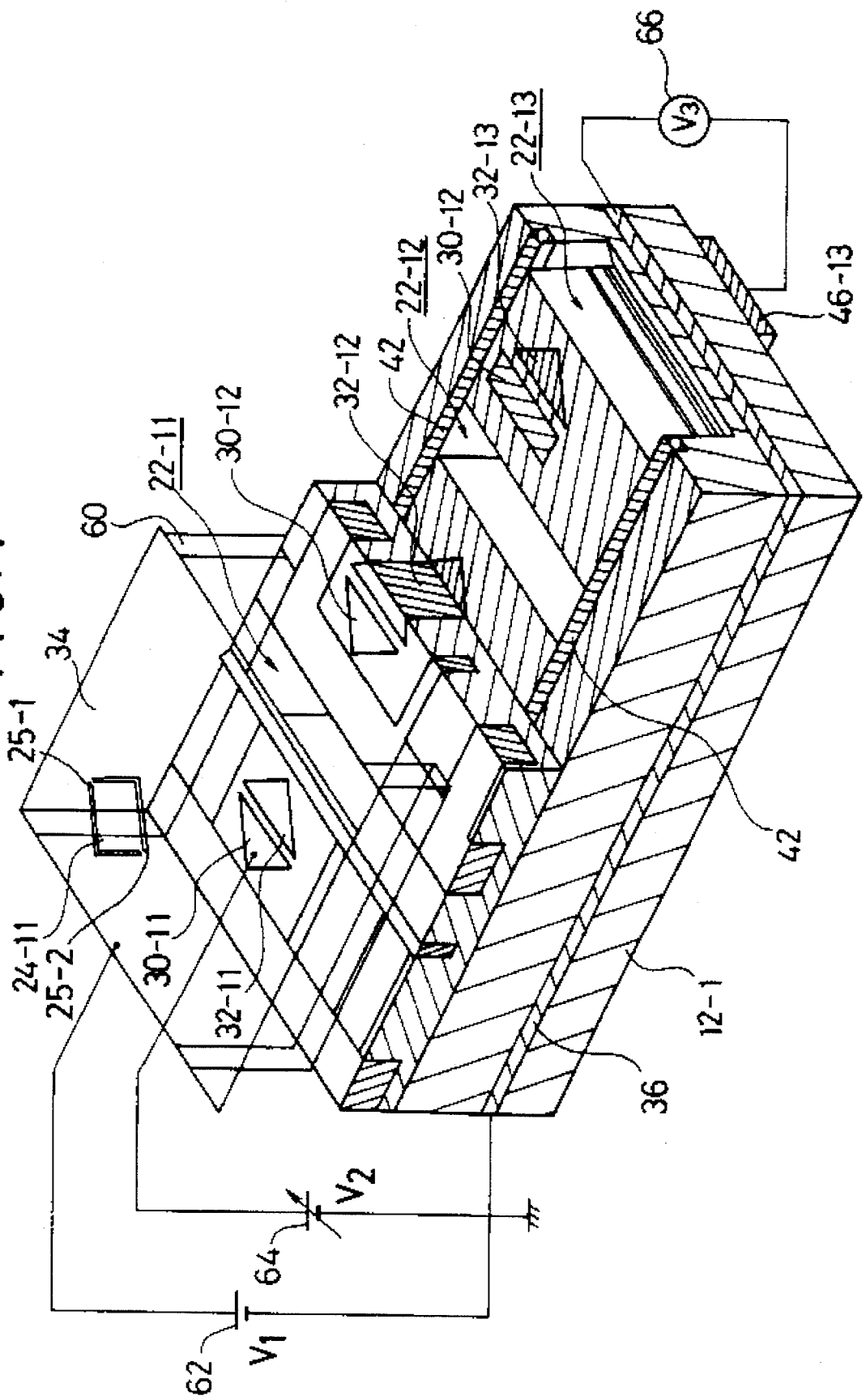
FIG. 7 is a stereoscopic cross sectional view of a whole structure of the device in FIG. 4.

FIG. 6 is a stereoscopic cross sectional view of a device structure to realize the mirrors 24-11 to 24-$mn$ and light sources 22-11 to 22-$mn$ provided for the display device 12 in FIG. 4. In FIG. 7, the portion of the internal mirror structure is taken out and shown together with a driving source. In the invention, a deformable mirror device for changing a mirror angle by deforming a mirror made by a metal thin film by a Coulomb's force of charges is used as a device to change the mirror angle in accordance with the signal from the outside.

As shown in FIG. 7, the deformable mirror device cuts out a mirror common electrode 34 made of a metal thin film like a rhombus so as to leave the rotary shaft sections 25-1 and 25-2, thereby forming the mirror section 24-11. In the lower portion of the mirror section 24-11, two electrodes comprising a field plate 30 and a common electrode plate 32 are arranged while sandwiching a mirror fulcrum axis. The mirror 24-11 can be driven by changing the respective potential differences of a field plate 30-11 and a common electrode plate 32-11 which construct the lower two electrodes. Therefore, a mirror driving constant voltage source 62 is connected between the mirror common electrode 34 on the mirror 24-11 side and a device common electrode 36 internally connected to the common electrode plate 32-11. A mirror driving signal source 64 is also connected between the field plate 30-11 and the device common electrode 36. It is now assumed that a constant voltage of the mirror driving constant voltage source 62 is set to V1 and a driving voltage of the mirror driving signal source 64 is set to V2. When V2=0, the mirror 24-11 is put at the most inclined position to the common electrode plate 32-11 side. When the driving voltage is changed to V2=V1, the Coulomb's force between the field plate 30-11 and the mirror common electrode 34 and the Coulomb's force between the common electrode plate 32-11 and the mirror common electrode 34 are balanced, so that the mirror 24-11 is set at the horizontal position as shown in the diagram. Further, assuming now that V2=2×V1, the Coulomb's force by the field plate 30-11 stronger than that by the common electrode plate 32-11, so that the mirror 24-11 inclines to the field plate 30-11 side.

The mirror driving signal source 64 in FIG. 7 is realized by an MOS transistor 25 as shown in FIG. 6. The MOS transistor 25 comprises a gate 38, an oxide 40, a drain 42, and further, a floating source 44 having the field plate 30. Therefore, by adding a control signal to the gate 38 from the outside, the applied voltage of the field plate 30 constructing a part of the floating source 44 is changed and the angle of the mirror 24 can be controlled. A light source 22 is provided in the lower layer of the MOS transistor 25 to drive the mirror 24. In the embodiment, the light source 22 is realized by an integrated structure of the semiconductor laser. Since a semiconductor laser of the end face light emitting type is used, an opening portion 52 is formed in a light emitting surface 48 from the upper position and a reflecting surface 50 of 45° is formed at the position which faces the light emitting surface 48. An electrode 46 for modulating a light source is provided in the lower portion of the semiconductor laser of the end face light emission constructing the light source 22. For example, as shown by an electrode 46-13 for light source modulation of a light source 22-13 in FIG. 7, therefore, by connecting a light source driving signal source 66 between the electrode 46-13 and the device common electrode 36, the light emitted from the light source 22 can be intensity modulated by the external signal.

Figure 8:
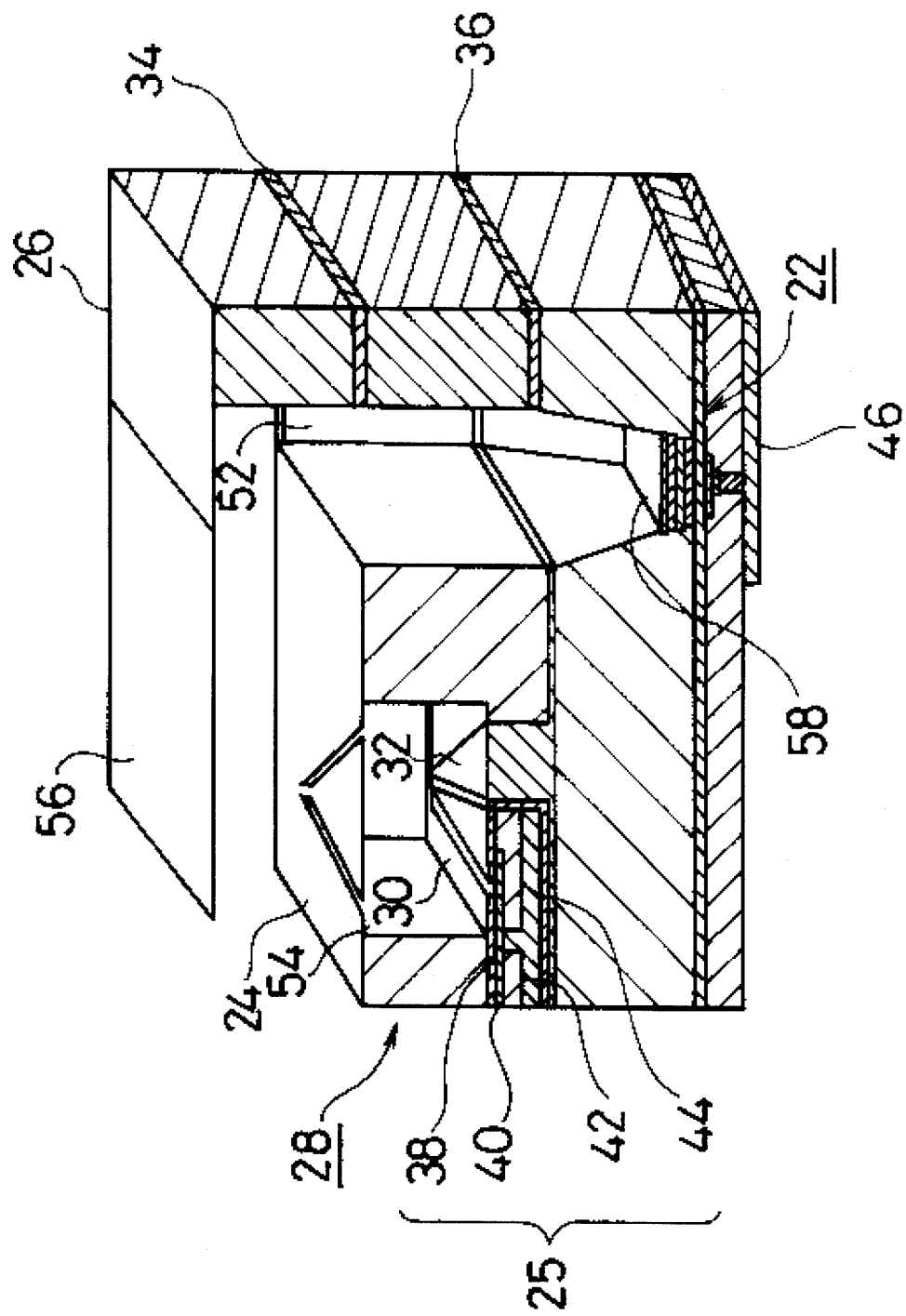
FIG. 8 is a stereoscopic cross sectional view of another detailed structure of one device in FIG. 4.

FIG. 8 shows another embodiment of a mirror and a light source which are used in the invention. The embodiment is characterized in that a semiconductor laser of the plane light emitting type is used as a light source 22. That is, although the same deformable mirror device as that in the embodiment of FIG. 6 is used, a semiconductor laser of the plane light emitting type having a light emitting surface 58 as a flat surface portion is formed with respect to the light source 22.

Figure 9:
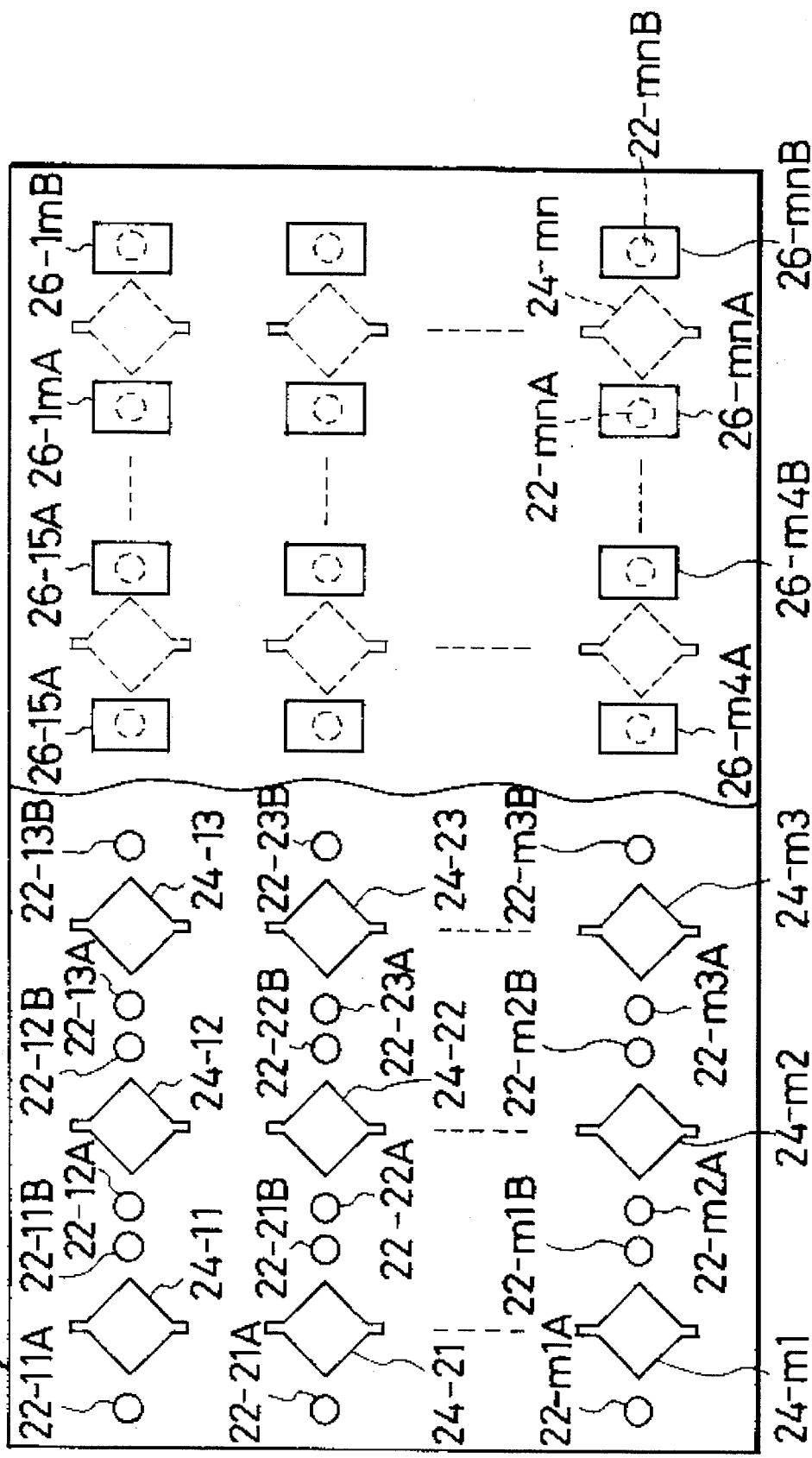
FIG. 9 is an explanatory diagram of the second embodiment of a device arrangement of the invention.

FIG. 9 shows the second embodiment of the display device 12 of the invention. The second embodiment is characterized in that two light sources (22-11A, 22-11B) . . . (22-mnA, 22-mnB) are provided for each of the mirrors 24-11 to 24-mn arranged at the predetermined period interval (P). In correspondence to the two light sources provided for one mirror, as shown by the non-cut portion on the right side, two diffraction gratings (26-15A, 26-15B) . . . (26mnA, 26-mnB) are also provided. The mirror 24-11 has a rhombic shape and has portions which are projected in the upper and lower directions. The upper and lower projecting portions serve as a rotary axis of the mirror 24-11. In case of providing two light sources for one mirror as mentioned above, the deflection angle of the light can be seemingly increased. For example, the light source 22-11A on the left side is used in the angle range on the right half side from the center of the mirror 24-11 and the light source 22-11B on the right side is used in the angle range on the left half side from the center of the mirror 24-11. Thus, the light can be deflected in the same range by a mirror angle smaller than that in case of using one light source.

Figure 10:
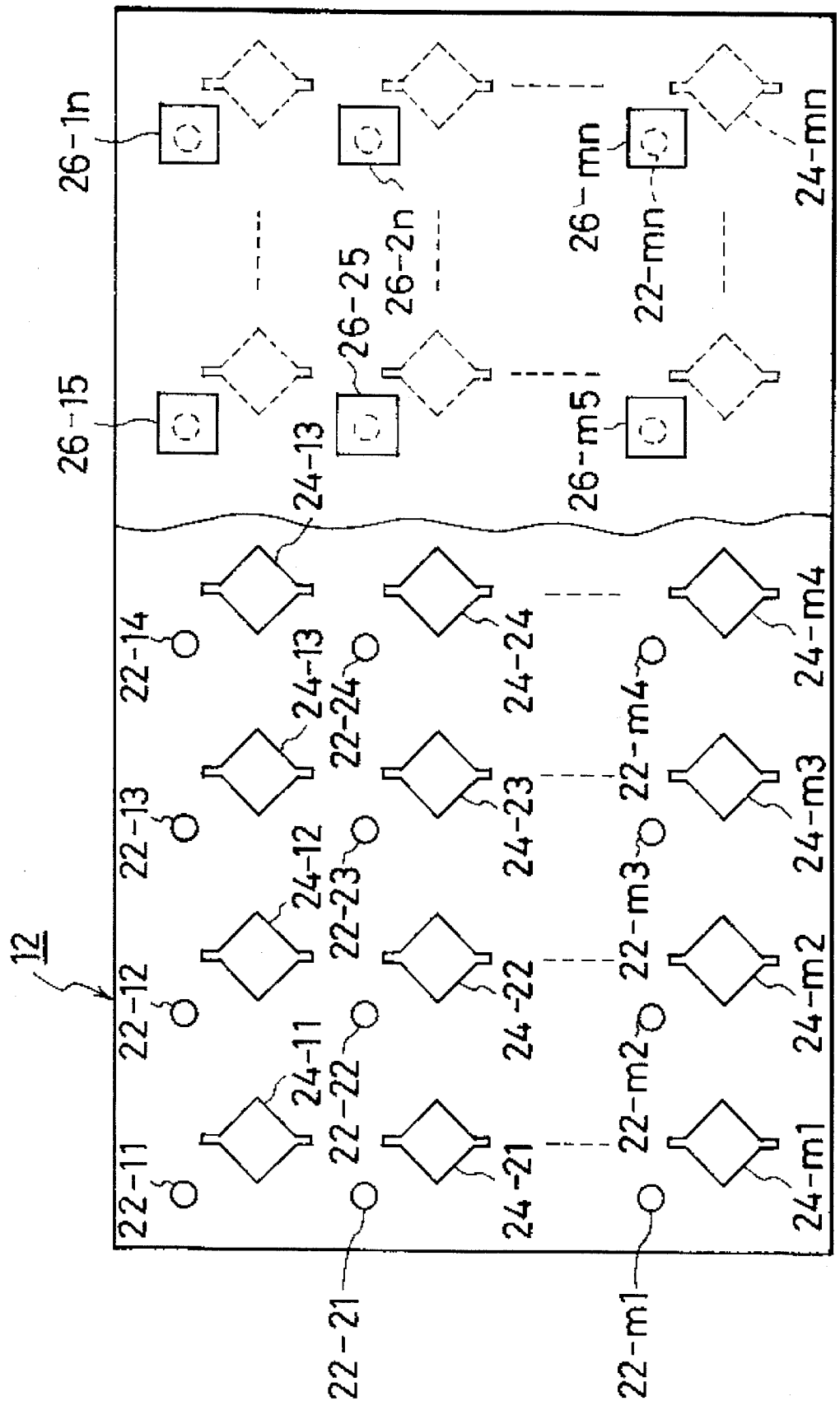
FIG. 10 is an explanatory diagram of the third embodiment of a device arrangement of the invention.

FIG. 10 shows the third embodiment of the display device of the invention. The third embodiment is characterized in that the light sources 22-11 to 22-mn are arranged at the left upper corners for the mirrors 24-11 to 24-mn. As shown on the right side as a non-cut portion, the diffraction gratings 26-15 to 26-mn are also arranged in upper portions of the light sources at the left upper corners for the mirrors in correspondence to the light sources. According to the embodiment, since the diffraction gratings aren't positioned in the light beam emitting range by the angle changes of the mirrors 24-11 to 24-mn, the mirror opening portions are not obstructed and a control range of the mirror angle can be widened.

Figure 11:
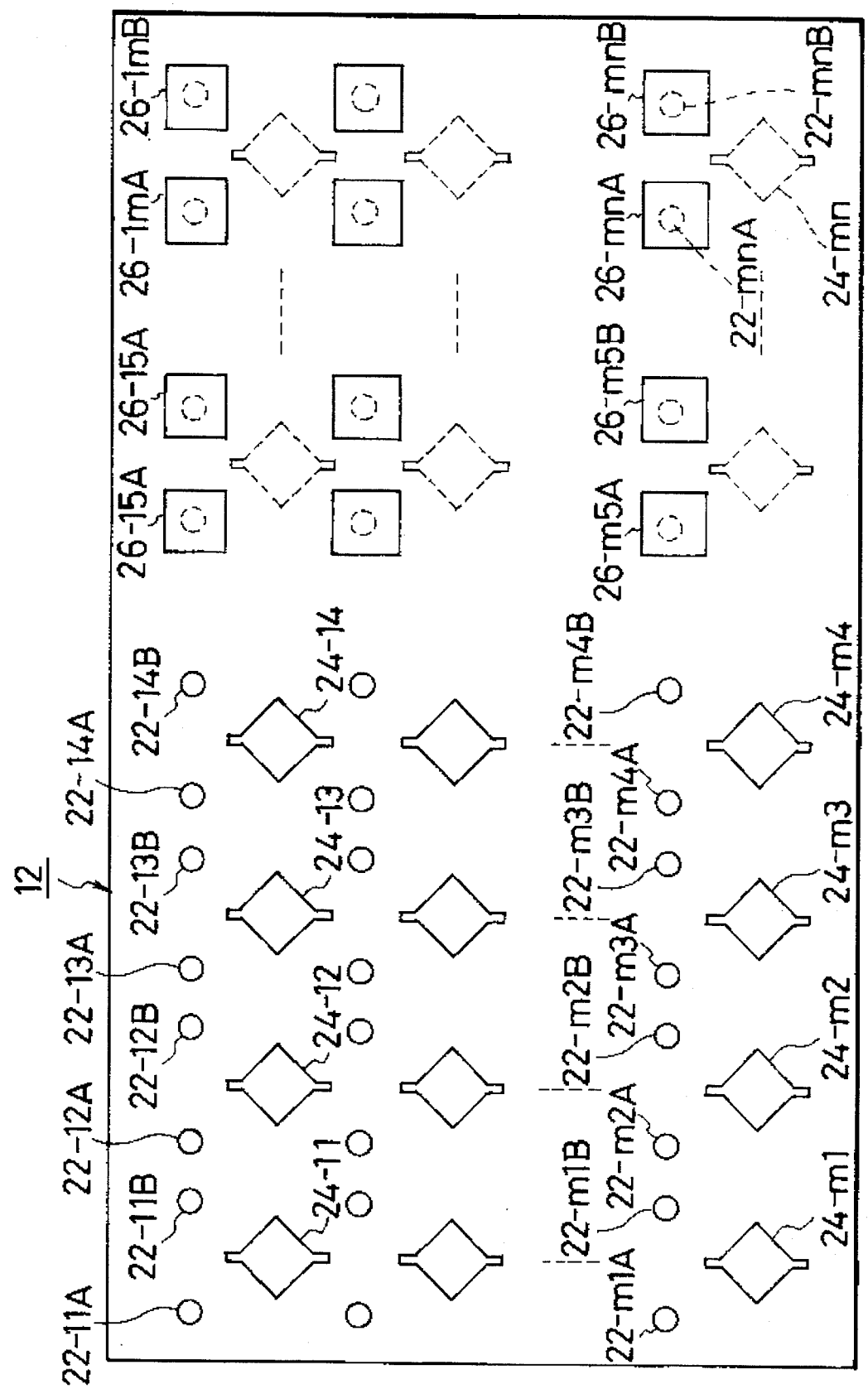
FIG. 11 is an explanatory diagram of the fourth embodiment of a device arrangement of the invention.

FIG. 11 shows the fourth embodiment of the display device which is used in the invention. For the mirror arrangement in FIG. 10, the fourth embodiment is characterized in that two light sources are provided for one mirror in a manner similar to the embodiment of FIG. 9. By providing two light sources, therefore, the deflection angle of the mirror is seemingly increased and since the diffraction gratings are arranged at the positions so as not to obstruct the mirror opening portions, so that the control range of the mirror angle can be widened.

Figure 12:
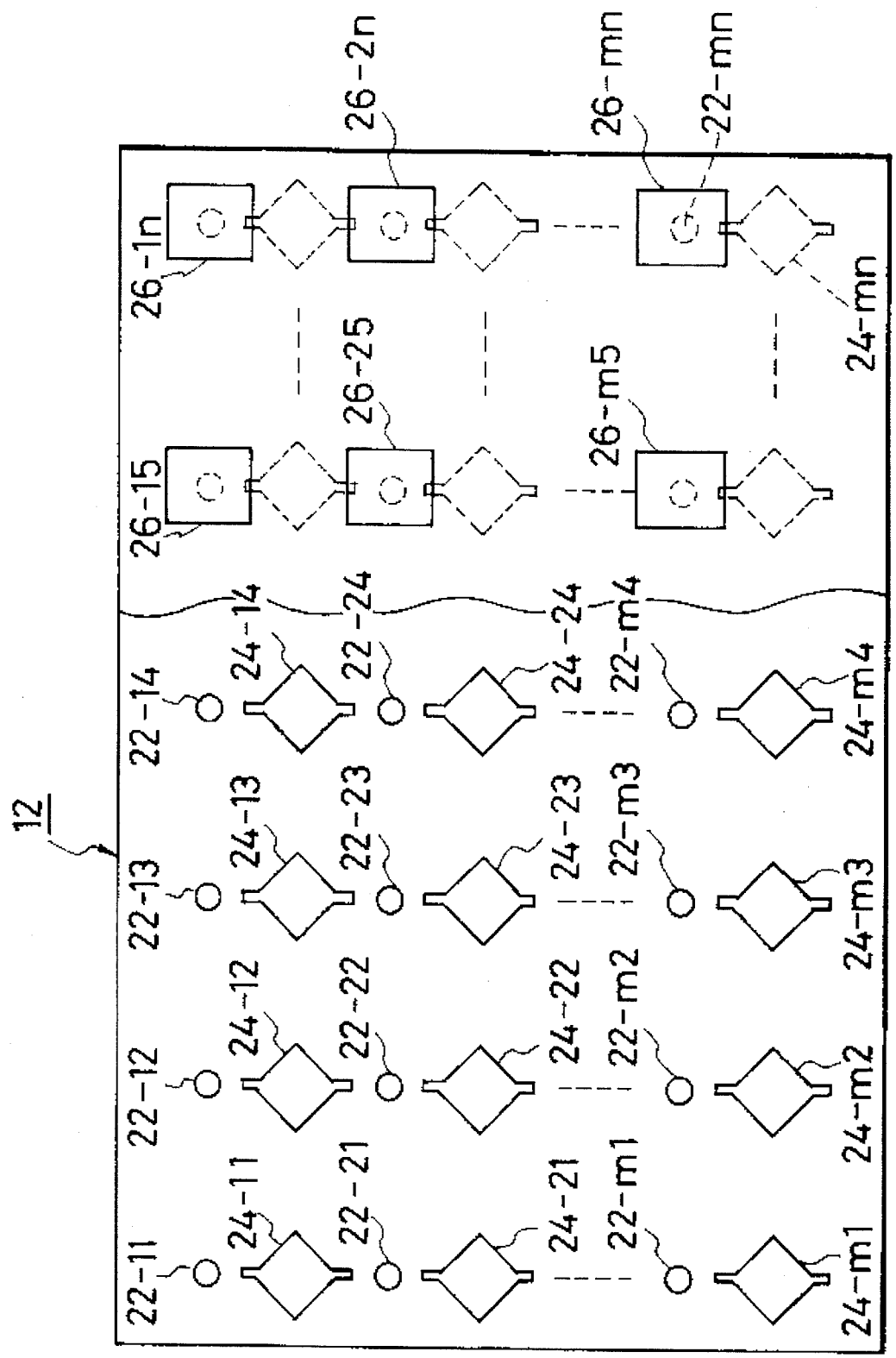
FIG. 12 is an explanatory diagram of the fifth embodiment of a device arrangement of the invention.

FIG. 12 shows the fifth embodiment of the display device of the invention. The fifth embodiment is characterized in that the light sources 22-11 to 22-mn are arranged on the fulcrum axes of the mirrors 24-11 to 24-mn. Thus, the diffraction gratings which are provided in correspondence to the light sources don't obstruct the mirror upper portions as in the diffraction gratings 26-15 to 26-mn, so that the control range of the mirror angle can be widened.

Although the device of the monolithic type has been used as a display device in the first to fifth embodiments mentioned above as an example, the display device can be also realized in a manner such that the light source section which is realized by the laser semiconductor and the mirror section using the deformable mirror device are separately constructed and both of them are adhered. An LED can be also used as a light source section in place of the laser semiconductor.

Figure 13:
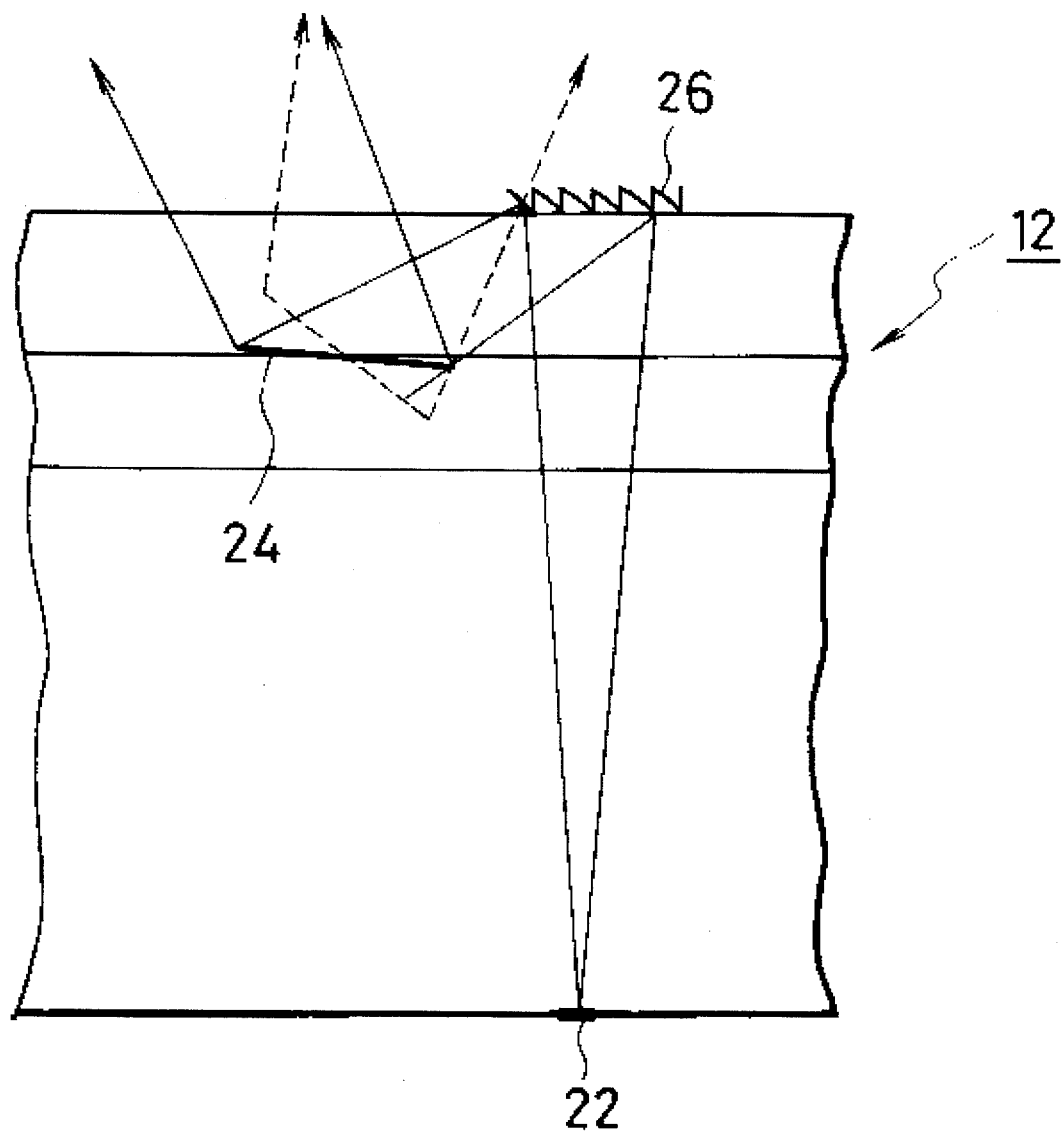
FIG. 13 is an explanatory diagram of the functions of a light emitting device, a diffraction grating, and a mirror in the device structure of the invention.

A deflection control of the display device using the diffraction grating and the mirror will now be explained in detail. FIG. 13 shows one device portion of the display device 12. The light emitted upward from the light source 22 is deflected obliquely downward by a diffraction grating 26 and enters the mirror 24. The mirror 24 is rotated by an external signal and reflects an incident light from the diffraction grating 26 in the direction according to the mirror angle at that time. In the display device of the invention, since the light from the light source 22 arranged like an array is deflected in the horizontal direction, it is desirable that the angle adjustment range of the mirror 24 is large. Thus, by setting an initial diffraction angle into the diffraction grating 26, sufficient light deflection (angle modulation) in the horizontal direction can be performed even when the angle adjustment range of the mirror is small.

Figure 14:
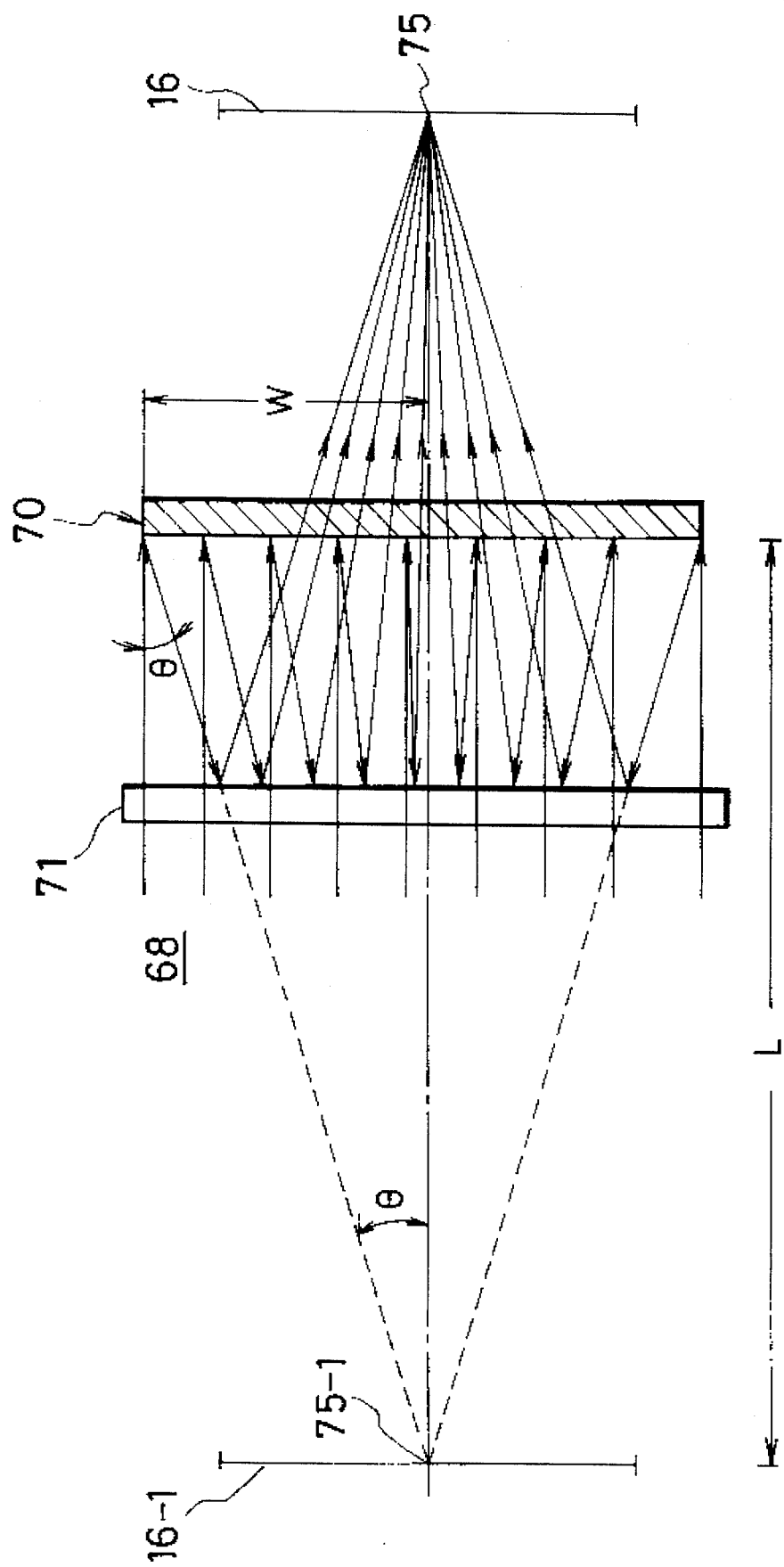
FIG. 14 is a plan view in the deflecting direction which is set to a deflecting device of the invention.

FIG. 14 is a diagram for explaining a diffraction angle which is preset to the diffraction gratings of the display device 12. Assuming now that an observation region 16-1 is located at a predetermined standard observation distance (L) away from a diffraction grating section 70. In such a state, an intersection point 75-1 with the axial line of the diffraction grating section 70 which passes through the observation region 16 is determined with respect to each of the diffraction gratings arranged in the diffraction grating section 70. An angle between the axial line and a line connecting each of the diffraction gratings and the point 75-1 is set as a diffraction angle θ for an incident light 68. In this instance, the observation region 16-1 shown on the left side is a virtual region when a mirror section 71 is not provided. By actually providing the mirror section 71, the observation region 16 shown on the right side is actually obtained. By setting the diffraction angle to diffract the light to the center point 75 of the observation region 16 is set into each diffraction grating, when each of the mirrors in the mirror section 71 is parallel with the arrangement surface, the light can be most efficiently deflected to the center point 75 of the observation range 16. In the image display of the same visual point region, since the deflection angles of the mirrors arranged in the vertical direction of the screen are equal, all of the mirrors in the vertical direction can be commonly driven. This means that the deflection devices arranged in the vertical direction can be constructed as one diffraction grating having the same diffraction angle.

Figure 15:
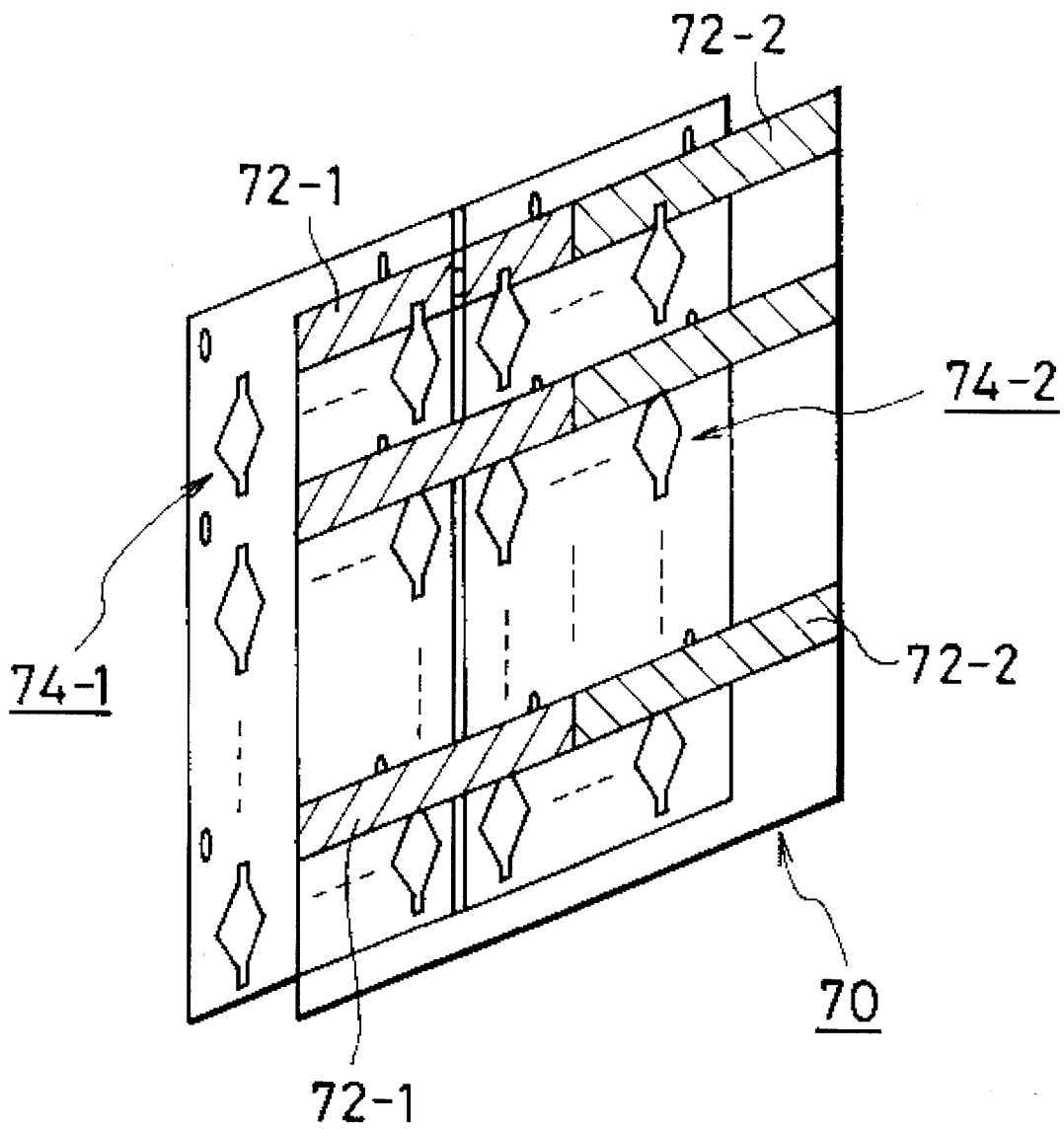
FIG. 15 is an explanatory diagram of an apparatus structure having the deflecting device having the deflecting function of FIG. 14 and the device arrangement of FIG. 9.

FIG. 15 is an explanatory diagram for realizing the display device in which the diffraction angle in FIG. 14 is initially set. In FIG. 15, for example, two display devices in FIG. 10 are prepared and are combined with the diffraction grating section 70 comprising: arrays 74-1 and 74-2 each having mirrors and light sources; and diffraction gratings 72-1 and 72-2 in FIG. 14 having a symmetrical structure in which the diffraction angle to deflect the light to the center of the observation range is set.

Figure 16:
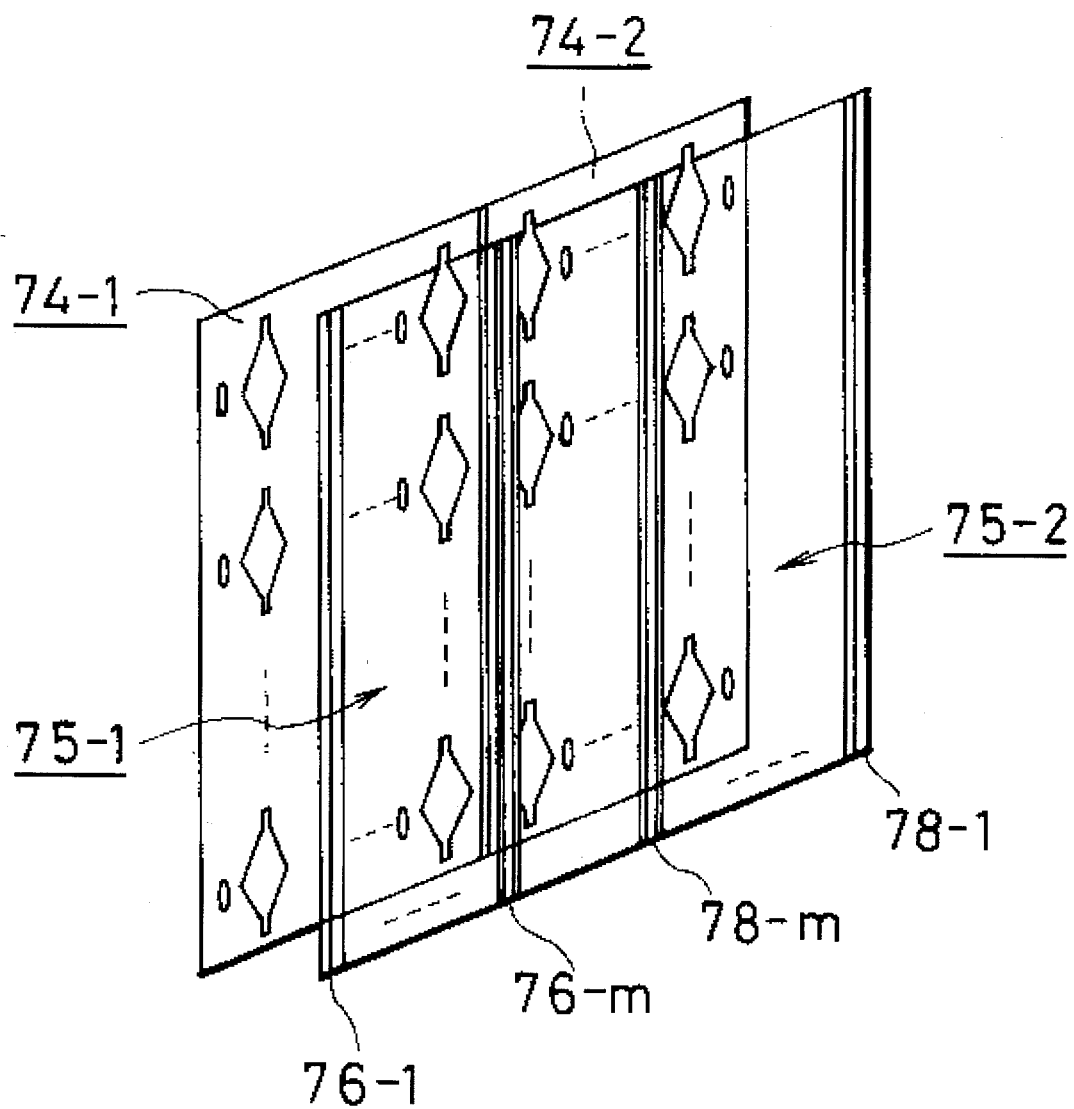
FIG. 16 is an explanatory diagram of an apparatus structure having the deflecting device having the deflecting function of FIG. 14 and the device arrangement of FIG. 7.

FIG. 16 shows the display device in FIG. 8 as an example. The arrays 74-1 and 74-2 each having the mirrors and the light sources are symmetrically combined so that the mirrors are arranged at the same period. Further, common electrodes 76-1 to 76-n and 78-1 to 78-n for mirror scanning in which the mirror driving electrodes are commonly used in the vertical direction are provided for electrode sections 77-1 and 77-2 in the lower portion of the arrays 74-1 and 74-2.

Figure 17:
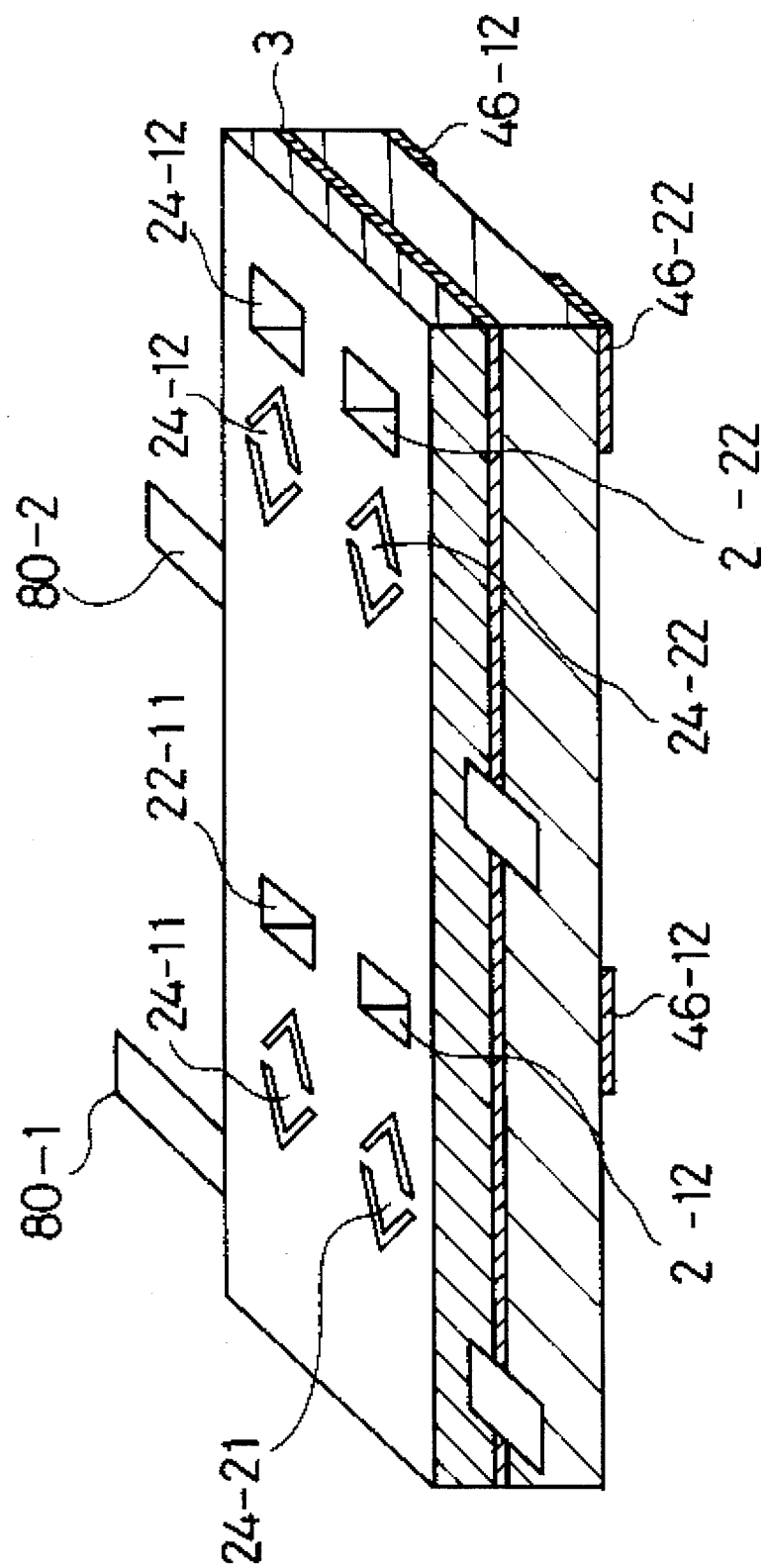
FIG. 17 is an explanatory diagram of a device structure in which mirrors arranged in the vertical direction are driven in a lump.
Figure 18:
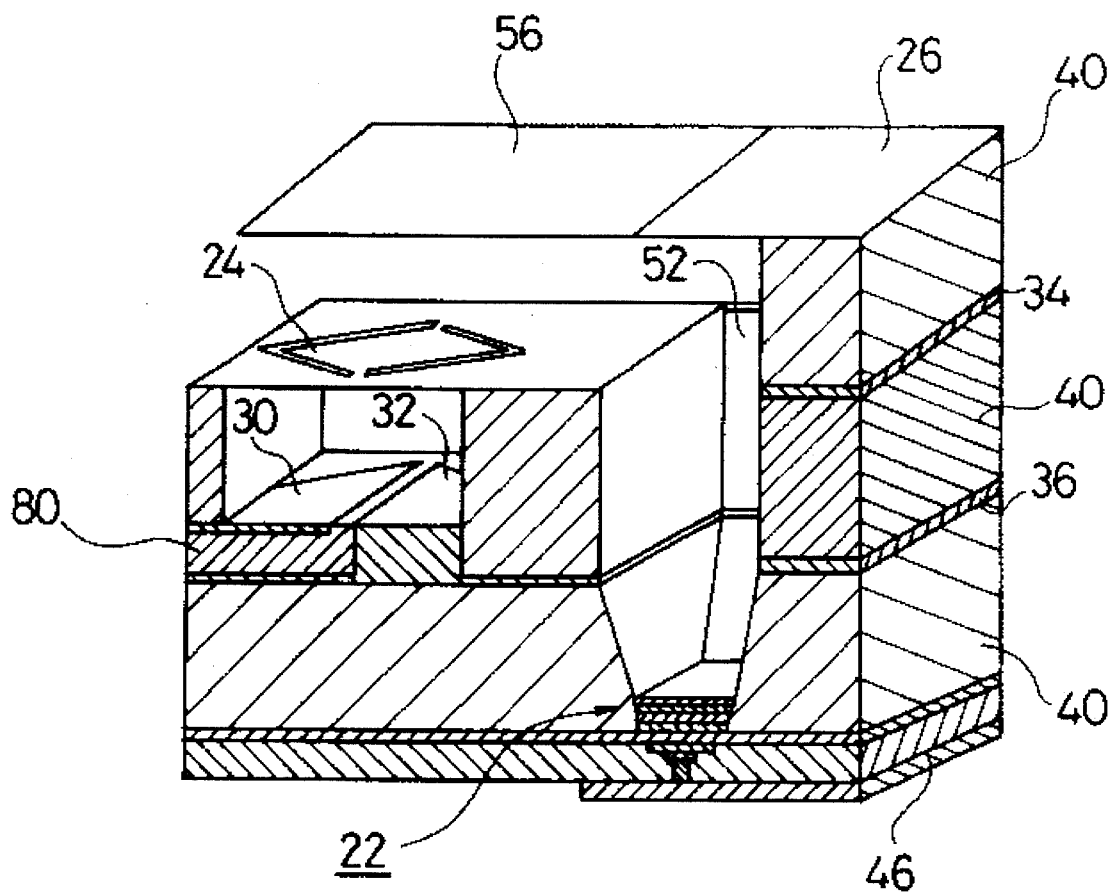
FIG. 18 is a stereoscopic cross sectional view of the device structure of FIG. 17.

FIG. 17 shows a part of the display device having the device structure of FIG. 16. The light emitting sections 22-11 to 22-22 are formed on the right side of the mirror sections 24-11 to 24-22, the mirror common electrode 34 is provided in the central layer, and electrodes 46-11 to 46-22 for modulating light sources are provided in the lower layer. Further, common electrodes 80-1 and 80-2 for mirror scanning to control the angles of the mirrors 24-11 to 24-22 are provided. The common electrodes 80-1 and 80-2 for mirror scanning are provided so as to be commonly used for the mirrors (24-11, 24-21) and (24-12, 24-22) arranged in the lateral direction. FIG. 18 shows an internal structure of the device of FIG. 17. Since an electrode 80 for mirror scanning is commonly provided for the mirrors in the vertical direction, it is unnecessary to individually provide the MOS transistor 25 as shown in FIGS. 6 and 8 for each mirror. It is sufficient to provide one MOS transistor for one electrode 80 for mirror scanning. Therefore, a simple structure having no MOS transistor as shown in FIG. 18 can be realized. Further, with respect to one MOS transistor which is provided for the electrode 80 for mirror scanning, the MOS transistor is provided on the outside of the device, so that the device structure can be further simplified. Although FIG. 18 shows the semiconductor laser of the plane emitting type has been used as a light source 22 as an example, the semiconductor laser of the end face light emitting type can be also applied in substantially the manner similar as that in the case of FIG. 6.

Figure 19:
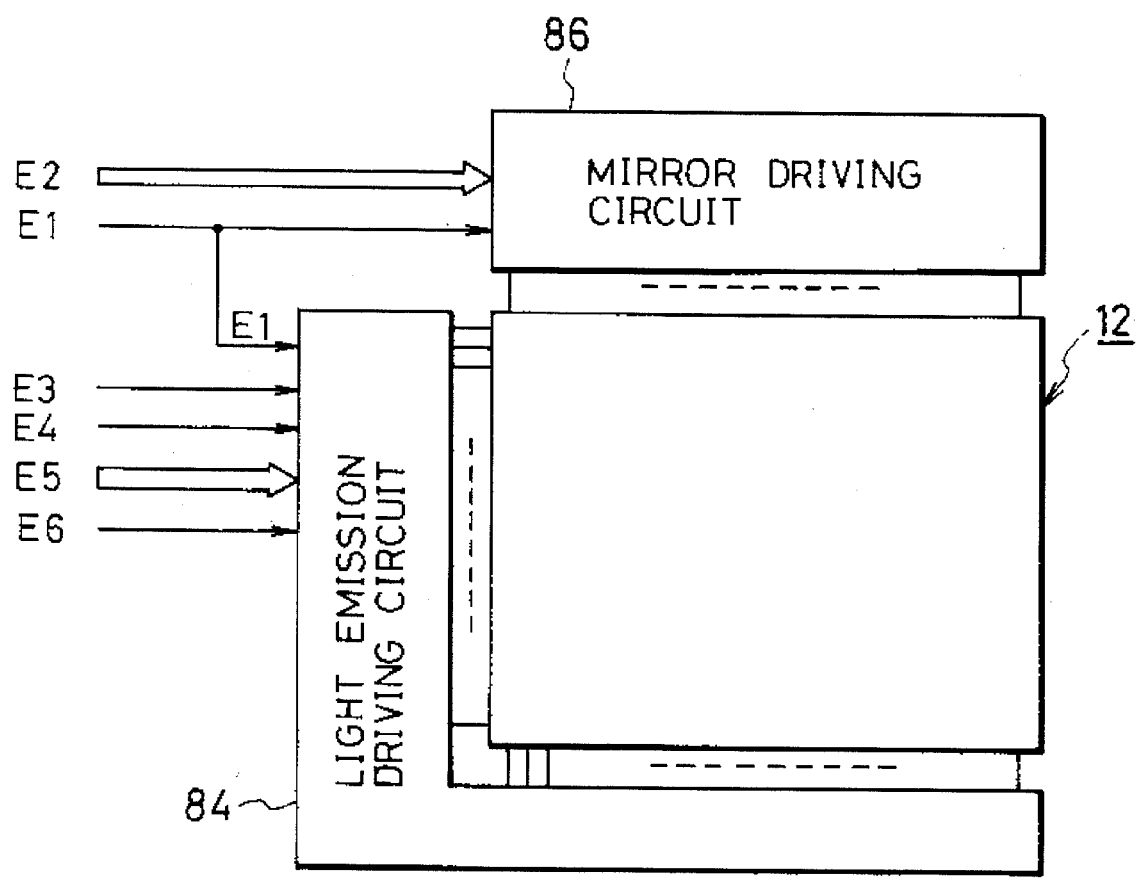
FIG. 19 is a block diagram of a driving circuit of the invention.

A driving circuit for allowing a stereoscopic image to be seen by using the display device 12 according to the invention will now be described. FIG. 19 is a schematic diagram of a driving circuit of a stereoscopic display apparatus of the invention. A light emission driving circuit 84 and a mirror driving circuit 86 are provided for the display device 12. The mirror driving circuit 86 performs an angle scan by using a group of mirrors arranged in the vertical direction in the display device 12 as one unit. The light emission driving circuit 84 receives serial pixel data and converts to parallel pixel data of one line in the vertical direction and performs the display on a unit basis of a vertical pixel group synchronously with the mirror driving of the vertical mirror group. Signals E1 to E6 to the mirror driving circuit 86 and light emission driving circuit 84 will be obviously described hereinlater.

Figure 20:
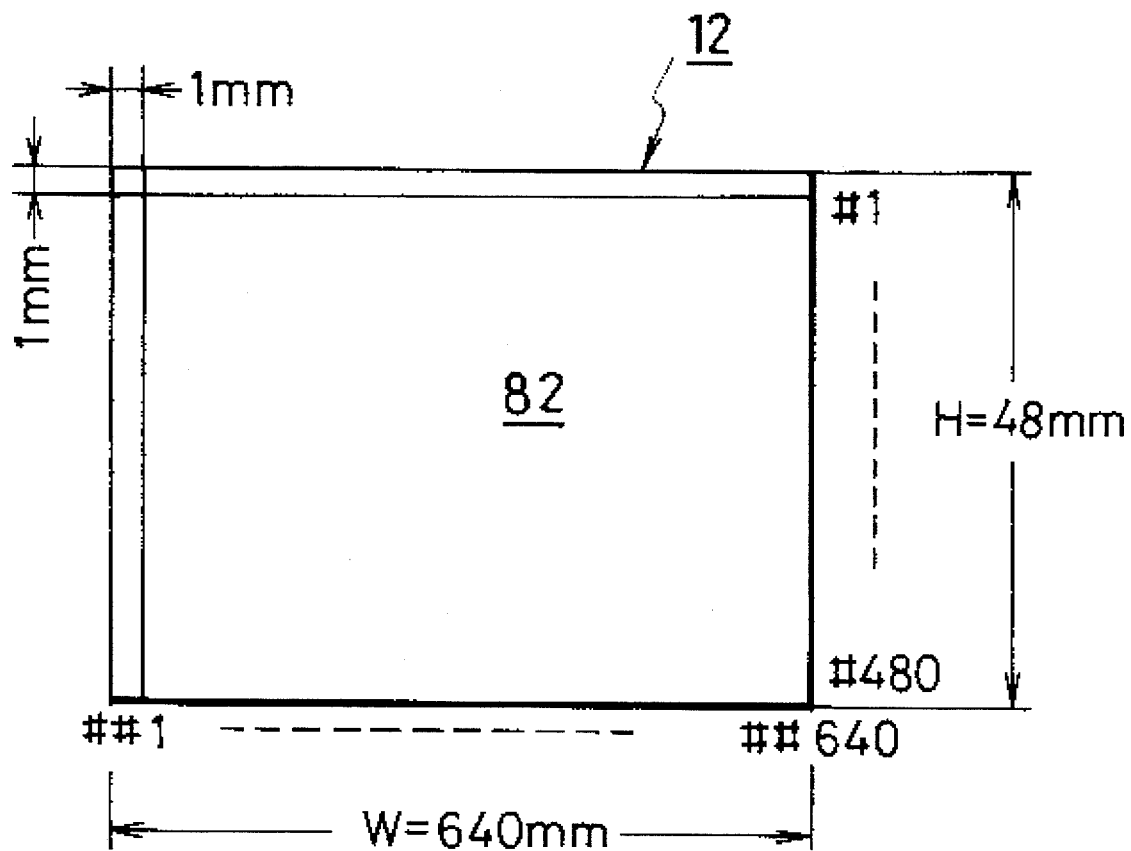
FIG. 20 is an explanatory diagram of a 2-dimensional image display surface which is used in the invention.

FIG. 20 shows a specific example of a display screen of the display device 12 of the invention. In the embodiment, a display screen 82 has 640 pixels in the horizontal direction and 480 pixels in the vertical direction. Pixel addresses in the horizontal direction are shown by ##1 to ##640. Pixel addresses in the vertical direction are shown by #1 to #480. A size of one pixel, namely, a mirror arrangement pitch is set to (1×1) mm. Therefore, the display screen 82 has dimensions such that a width in the horizontal direction is set to W =640 mm and a height in the vertical direction is set to H =480 mm. Further, a diffusion angle $\Delta\theta$ for one visual point region in the observation region that is away from each pixel of the display screen 82 by a predetermined distance is set to 0.3°.

Figure 21:
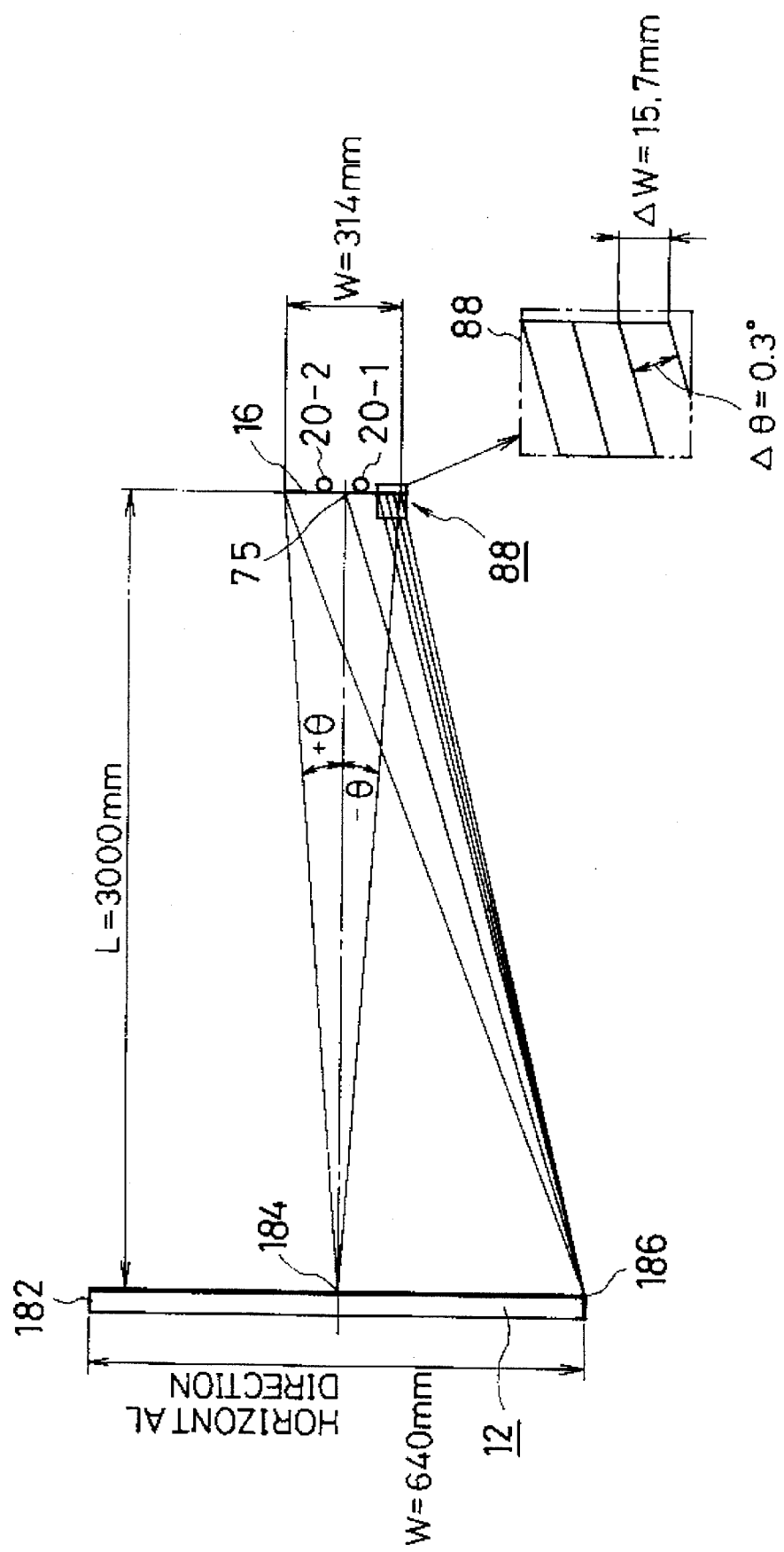
FIG. 21 is an explanatory diagram of a deflection control at the horizontal surface according to the invention.
Figure 23:
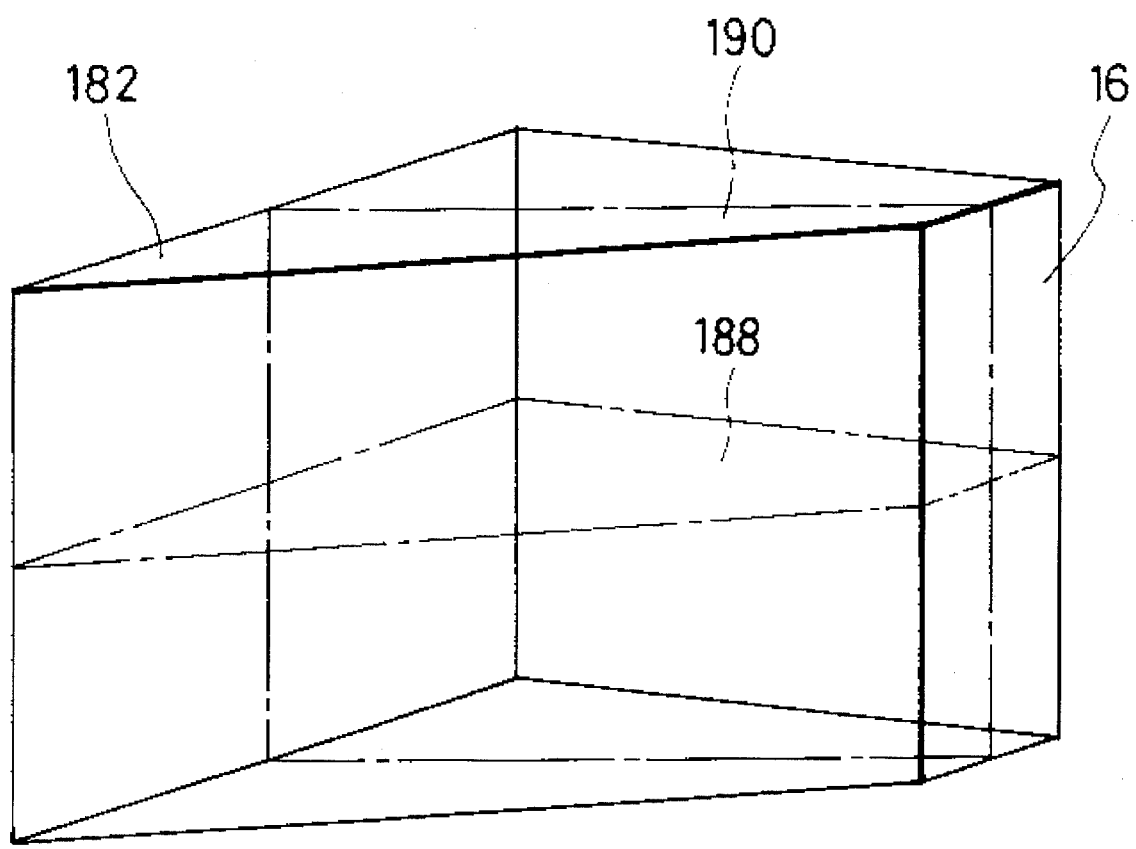
FIG. 23 is an explanatory diagram of cut surfaces of FIGS. 21 and 22.

FIG. 21 is a diagram showing like a plan view the relation of the observation range 16 for a display screen 182. FIG. 21 is a diagram which is obtained when a cut surface 188 in FIG. 23 is seen. It is now assumed that 3,000 mm is set as a standard observation distance (L) for the display screen 182. At the observation distance (L)=3,000 mm, when the diffusion angle $\Delta\theta$ for one visual point region of each pixel in the display device 12 is equal to 0.3°, an opening width $\Delta w$ at the position of the observation range 16 is equal to 15.7 mm. Now, assuming that the dividing number of the visual point regions of the observation region 16 in the horizontal direction is set to (N)=20, a width (w) of the observation region 16 is $$w = \Delta w \times N = 15.7 \times 20 = 314 \text{ mm}$$

When an attention is paid to a central point 184 of the display screen 182 in FIG. 21, a deflection angle from the pixel at the central point 184 to the observation range 16 divided into 20 visual point regions is set to $\pm\theta$ with respect to the center line. In this case, the deflection angle is equal to ±3°. On the other hand, when an attention is paid to a point 186 at the right corner of the display screen 182, a deflection angle of the pixel for the center line passing through a center point 75 of the observation region 16 is also set to $\pm\theta=\pm 3°$ with respect to the pixel at the point 186.

The deflection angles $\pm\theta$ of all of the pixels in the horizontal direction are equal with respect to all of the 640 pixels arranged in the horizontal direction in FIG. 20. That is, with respect to the diffraction gratings included in all of the 640 pixels arranged in the horizontal direction, the deflection angles passing through the center point 75 of the observation range 16 as shown in FIG. 14 are set so as to be obtained in a parallel state of the mirrors for the display surface. Each of the pixel mirrors arranged in the horizontal direction is rotated by an angle $(\theta/N)°$ at a time in the range of the deflection angle $\pm\theta$, thereby making it possible to realize the deflection for the 20 divided visual point regions in the observation region 16. Namely, the mirror is rotated by an angle 0.15° at a time in a range of ±1.5°. From the relation shown in FIG. 21, the relation between the predetermined period interval (P) of the mirrors in the display device 12 of the invention and the distance (L) to the observation range 16 is generally $\tan^{-1}(P/L) \leq (\theta/N)$. Preferably, it is sufficient to decide the relation so as to satisfy $\tan^{-1}(P/L) \leq 1'$. Practically, as mentioned above, it is sufficient to set $\tan^{-1}(P/L) \leq 0.3°$ in consideration of a margin.

Figure 22:
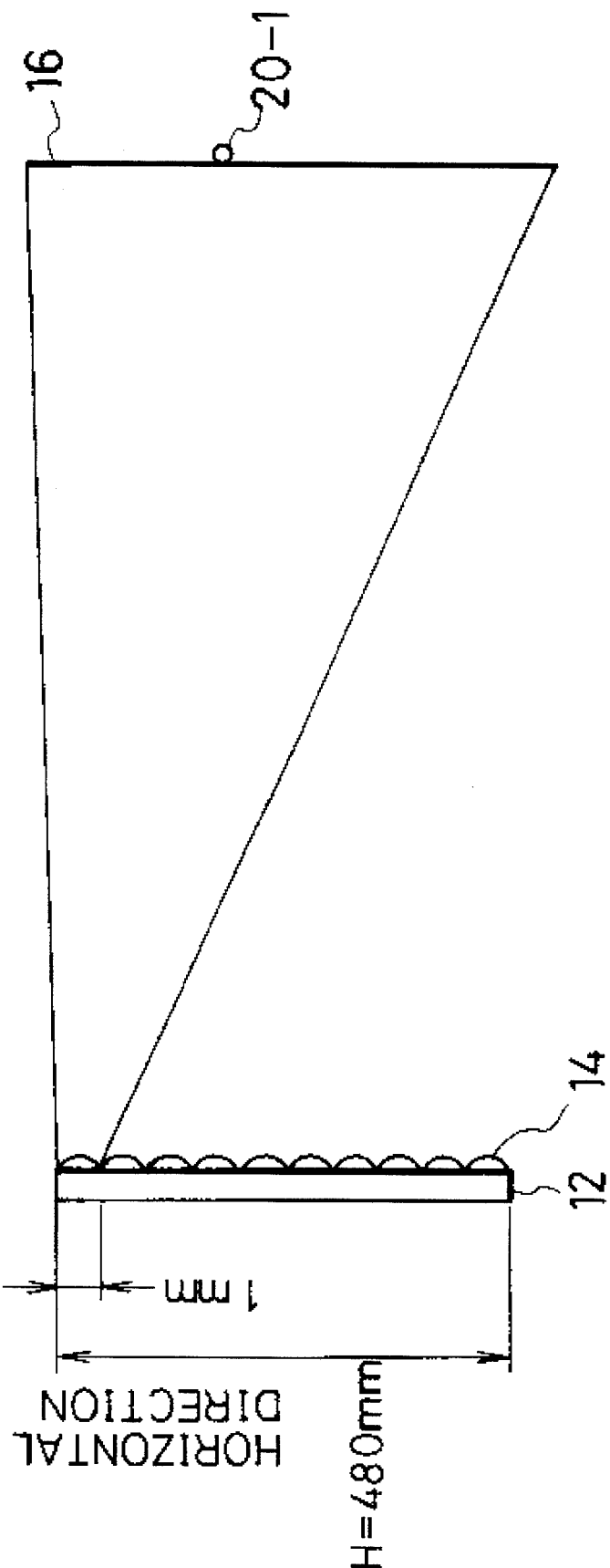
FIG. 22 is an explanatory diagram of an enlarging function at the vertical surface according to the invention.

FIG. 22 shows the relation between the display device 12 and the observation region 16 with respect to the vertical direction. Since no parallax is needed in the vertical direction, in addition to the display device 12 of the invention, the lenticular lens 14, serving as a light diffusing section to enlarge the light beam from the display device 12 in the vertical direction, is arranged. Additionally, a hologram sheet, serving as a light diffusing section in place of the lenticular lens 14, may be used. The hologram sheet includes a plurality of holograms each having a micro one-dimensional phase distribution. FIG. 22 is a diagram which is obtained when seeing a cut surface 190 in FIG. 23.

Figure 24:
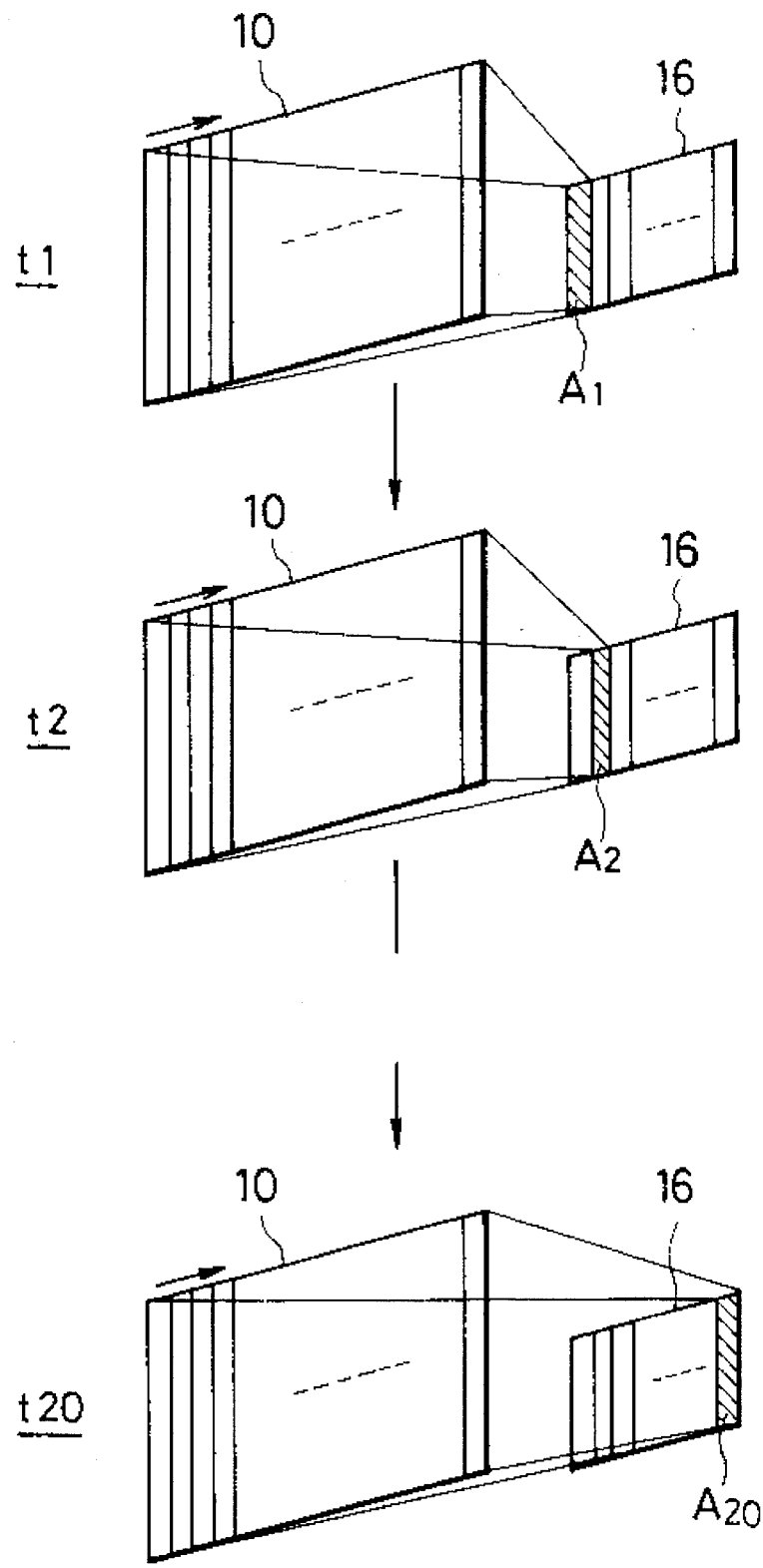
FIG. 24 is an explanatory diagram of a change of a stereoscopic display with respect to the time according to the invention.

FIG. 24 shows the display operation by the driving circuit of FIG. 19 with respect to the time while dividing the display operation into 20 scenes corresponding to the number of visual point regions. First at time t1, a 2-dimensional image for a visual point region A1 in the observation region 16 is displayed by the stereoscopic display apparatus 10 and is deflected into the visual point region A1 as shown in the diagram. At time t2, a 2-dimensional image corresponding to a next visual point region A2 in the observation range 16 is displayed by the stereoscopic display apparatus 10. The light beam from the display image is deflected into the visual point region A2. In a manner similar to the above, the display and deflection of the 2-dimensional image are repeated. At time t20, the 2-dimensional image in the last visual point region A20 is displayed and deflected. Such processes at times t1 to t20 are repeated at a period of, for example, 1/30 second. Therefore, now assuming that the pixel data is 8-bit data of 256 gradations, the data transfer amount is (640 pixels)×(480 pixels)×(8 bits)×(20 visual point regions)×(30 picture planes/sec)=1.47 Gbps With respect to the mirror driving, since the images of the 20 visual point regions corresponding to the number (=20) of visual point regions are time-divisionally displayed at a speed of 30 picture planes per second, the display operation time of one picture plane is 1/[(20 visual point regions)×(30 picture planes)]=1.7 msec As mentioned above, the data transfer amount is also equal to about 1.5 G and the display operation time of one picture plane is also equal to 1.7 msec and they can be sufficiently realized by the present circuit technique.

Figure 25:
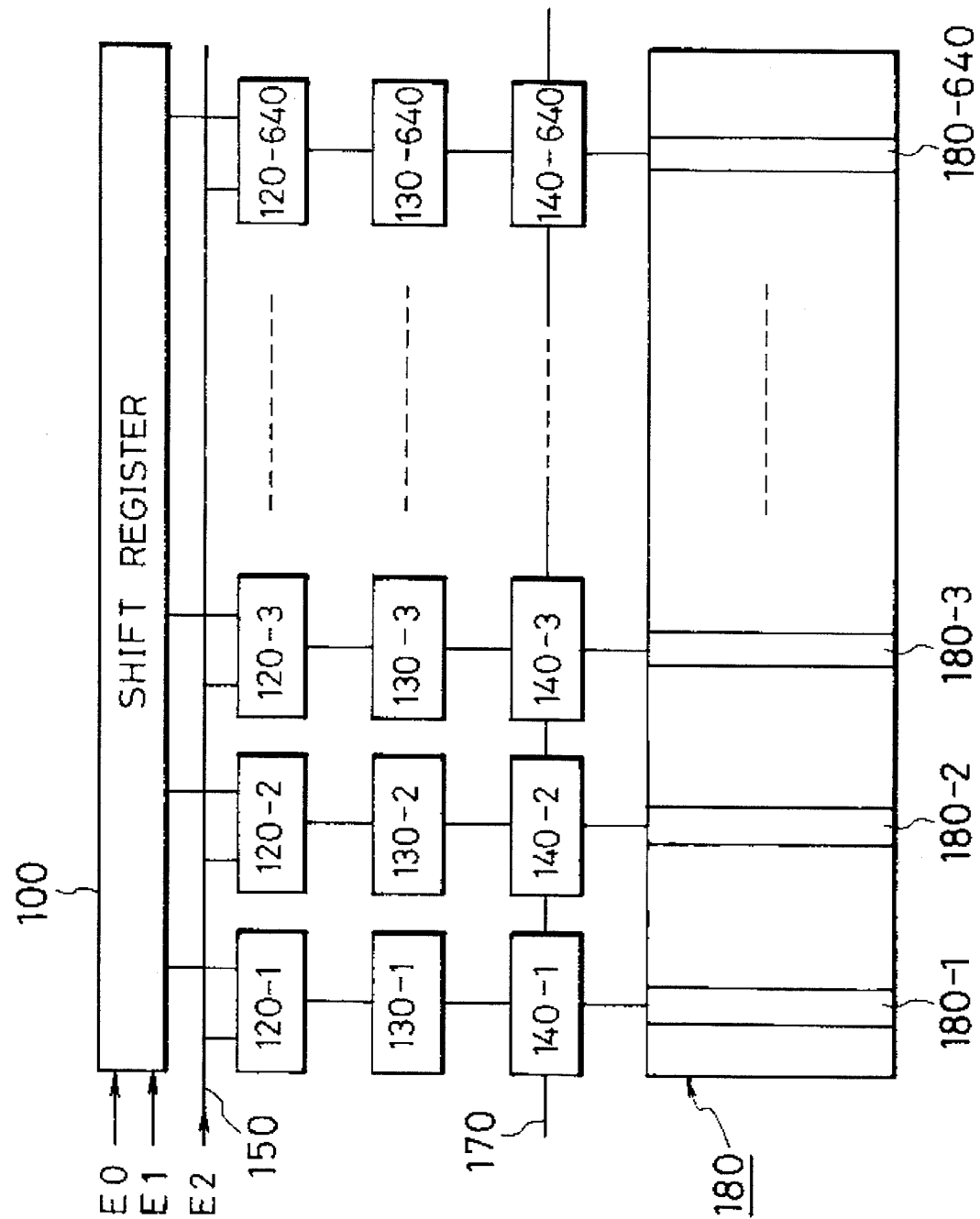
FIG. 25 is a block diagram of the embodiment of a mirror driving circuit in FIG. 19.

The light emission driving circuit and mirror driving circuit in FIG. 19 will now be described in detail. FIG. 25 shows an embodiment of the mirror driving circuit. The mirror driving circuit comprises: a shift register 100; latch circuits 120-1 to 120-640; decoding circuits 130-1 to 130-640; and voltage generating circuits 140-1 to 140-640. The shift register 100 receives a clock signal E1 which is obtained in a period T1 that is decided by a visual point region sync signal E0 and sequentially generates shift outputs of 640 pixels. A mirror driving data signal line 150 is connected to the latch circuits 120-1 to 120-640. Mirror driving data E2 to change a mirror angle by 0.15° at a time is given synchronously with the visual point region sync signal E0. Therefore, the latch circuits 120-1 to 120-640 latch the mirror driving data E2 transferred at that time by the shift outputs from the shift register 100. The decoders 130-1 to 130-640 decode the latched mirror driving data and convert to the data indicative of a control level (m) for the deformable mirror device provided for the display device 12. For example, assuming that the mirror control data consists of (n=8 bits), the level is converted to 0 to 255 stages which are given by the level (m=$2^n$). The voltage generating circuits 140-1 to 140-640 receive voltage supplies from a voltage supply line 170 and generate mirror control voltages corresponding to the decoded control data. The control voltages from the voltage generating circuits 140-1 to 140-640 are commonly supplied to a group of vertical mirrors 180-1 to 180-640 at a mirror arrangement surface 180 of the display device 12, thereby driving the group of mirrors arranged in the vertical direction so as to obtain a mirror angle according to the control voltages given in a lump.

FIGS. 26A to 26F are operation timing charts of the mirror driving circuit section in FIG. 25. First, the scene sync signal E0 of FIG. 26A has the period T1. In case of displaying the 20 visual point regions at a period of 1/30 second, since a signal period is set to 600 Hz, T1 =about 1.7 msec. The clock signal E1 of FIG. 26B is generated in the period T1 of the scene sync signal E0 in correspondence to the number (=640) of pixels in the horizontal direction and has a period T1' and T1'=2.6 μsec.

The mirror driving data E2 of FIG. 26C is given synchronously with the scene sync signal E0 of FIG. 26A. Driving data MD-1 to MD-20 corresponding to the visual point regions A1 to A20 in the display range are repetitively outputted as driving data E2.

The first driving data MD-1 having the contents of the mirror driving data E2 is sequentially latched into the latch circuits 120-1 to 120-640 as shown in FIG. 26D synchronously with a clock output based on the clock signal E1 of FIG. 26B. Latch outputs of the latch circuits 120-1 to 120-640 are decoded and are further converted to control voltages, thereby sequentially driving the group of vertical mirrors 180-1 to 180-640. Namely, when considering the vertical mirror group 180-1 of the address ##1 in FIG. 26E as an example, the mirror driving voltage is first located at an angle θ1 corresponding to the first visual point region A1 in the display range. The driving data MD-1 is given as data to maintain the angle θ1. The angle 81 is the initial value at each mirror and is set to a predetermined bias value irrespective of the mirror driving data. Therefore, even if there is no data input, the mirror is first held at the angle θ1. Therefore, the first driving data MD-1 is what is called zero data.

When the data is subsequently switched to the mirror driving data MD-2, the mirror driving operation to an angle θ2 is performed with a certain delay time. In a manner similar to the above, the angle controls of mirror angles θ3 to θ20 corresponding to the remaining driving data MD-3 to MD-20 are executed. On the other hand, a similar mirror driving scan is performed to the vertical mirror group 180-2 of the second address ##2 in FIG. 26F with a delay time of the period T1 of the clock signal E1.

FIGS. 27A to 27D show controls of light sources synchronized with the mirror driving scans of FIGS. 26A to 26F and also show a control of a mirror angle in one-scene scan time corresponding to the scan time of the 20 divided visual point regions. First, a period from a cycle C1 to C640 of a trigger signal E1 in FIG. 27A is set to the scan time T1 of one visual point region. The deflection controls of the group of 640 vertical mirrors are executed by using the same mirror driving signal. For example, when considering a change in light emission of the vertical mirror group 180-1 of the address ##1 in FIG. 27D as an example, the control of the mirror angle to deflect and scan the 20 visual point regions of the observation region every visual point scan time T1 is executed for one scene scan time T0. In the vertical mirror group 180-1 of the address ##1, when it is assumed that an emission angle for the first visual point region A1 is equal to 3.3° and an emission angle for the last visual point region A20 is equal to 9.3°, light emission angles 3.3°, 3.6°, 3.9°, . . . , 8.7° which are sequentially increased by 0.3° at a time are outputted for the visual point regions A1 to A20. The process of one scene scan time T0 is finished and the emission angle is again returned to 3.0° in the initial state. In this case, it is also possible to perform a mirror angle scan shown by an alternate long and two short dashes line such that the emission angle is not returned to 3.0° of the initial state at the time point of the elapse of one scene scan time but is contrarily returned to the first visual point region A1 from the last visual point region A20. A light-on gate signal shown in FIG. 27C will be clearly understood by the following description of the light source driving circuit.

FIG. 28 shows an embodiment of the light source driving circuit of the invention. The light source driving circuit comprises: a shift register 200; first latch circuits 210-1 to 210-480; second latch circuits 220-1 to 220-480; decoding circuits 230-1 to 230-480; voltage generating circuits 240-1 to 240-480; and further a light-on gate signal generating circuit 290. The shift register 200 receives 480 clock signals E4 and sequentially generates shift outputs every period T1 at which the clock signal E1 is inputted. The first latch circuits 210-1 to 210-480 fetch image data E5 transferred to an image data line 260 when the shift output of the shift register 200 is obtained. Pixel data of 480 pixels is transferred as image data E5 for the period T1 of time of the clock signal E1. Therefore, the first latch circuits 210-1 to 210-480 sequentially hold the pixel data of 480 pixels in the vertical direction in the display device 250 by the shift output of the shift register 200. The second latch circuits 220-1 to 220-480 latch the pixel data of 480 pixels outputted from the first latch circuits 210-1 to 210-480 at the timing of the generation of the last pixel data by the same trigger signal E6 as the clock signal E1 for the shift register 200 and output the pixel data to the decoding circuits 230-1 to 230-480 in parallel. Now, assuming that the pixel data consists of eight bits, for example, the decoding circuits 230-1 to 230-480 convert the pixel data to the gradation signals of 256 stages. The voltage generating circuits 240-1 to 240-480 convert a voltage obtained from a voltage control line 280 to a control signal voltage of a light source such as semiconductor laser or light emitting diode provided for a light source arrangement surface 250 on the basis of the decoding output and generate.

FIGS. 29A to 29E are timing charts for the light source control operation in FIG. 28. As shown in FIG. 29C, 480 pixel data E5 at the horizontal positions of horizontal light source device groups 250-1 to 250-480 of the light source arrangement surface 250 are inputted every cycles C1, C2, ..., C480 which are determined by the input of the trigger signal E1 in FIG. 29A. For example, pixel data shown at D1-1 to D1-480 is inputted at the C1 cycle. The first latch circuits 210-1 to 210-480 sequentially latch the pixel data D1-1 to D1-480 on the basis of the shift output of the shift register 200 synchronized with the clock signal E4 in FIG. 29B. When the last pixel data D1-480 is latched in the C1 cycle, the second latch circuits 220-1 to 220-480 execute the latching operations by the trigger signal E6 synchronized with the first trigger signal E1 in the next C2 cycle and generate the pixel data D1-1 to D1-480 in parallel. A control voltage of each light source is outputted by the decoding and voltage generation.

FIG. 30 shows the details of the light-on gate signal generating circuit 290 in FIG. 28. The light-on gate signal generating circuit 290 comprises a shift register 310 and signal generating circuits 320-1 to 320-640.

According to the invention as described above, a deflecting section to deflect the emission light onto the mirror upper surface is provided over the light source in the light emitting direction, thereby enabling the light emitting surface and the mirror surface to be arranged on the same plane. Therefore, a simple shape such that the array-like arrangement of the light sources and mirrors can be formed on the same substrate is obtained. The display device can be easily manufactured by the integration technique. A natural stereoscopic display which is equivalent to the holographic stereogram which doesn't need the calculation of the phase distribution can be realized.

Although the above embodiment has been described with respect to the use of the display device as a stereoscopic display apparatus as an example, there is also a case where the display device of the invention is manufactured by combining a device in which the mirrors and light sources are arranged in an array shape and a device which is arranged thereon and in which diffraction gratings are arranged in an array shape. Therefore, a spatial light modulating apparatus as a device sole body in which the mirrors and light sources are arranged in an array shape is also included. Although the above embodiment has been described with respect to the case of using the diffraction grating as a light deflecting section as an example, a hologram in which the same deflecting function as the diffraction grating is realized by an interference fringe can be also used. Although the deformable mirror device has been explained as a mirror as an example, a proper movable mirror device which can be monolithically manufactured together with the light source section such as semiconductor laser, light emitting diode, or the like can be also used. Further, the invention is not limited by the numerical values shown in the above embodiment.

What is claimed is:

1. A spatial modulating apparatus which is used to display a stereoscopic image, comprising:

a plurality of light source sections which are two-dimensionally arranged on an apparatus substrate at a predetermined period interval (P) set to satisfy $\tan^{-1}(P/L) \leq 0.3$ for a standard observation distance (L) from an observing position to a mirror surface, each to intensity modulate a light emitted in accordance with an image signal and then to output the modulated light thereby displaying a 2-dimensional image;

a plurality of mirror sections having reflecting surfaces which are periodically arranged in correspondence to said plurality of light source sections, a direction of each of said reflecting surfaces being changeable;

a plurality of mirror driving sections which are provided in correspondence to said plurality of mirror sections, each to control the change of direction of each of the reflecting surfaces by an external signal, thereby angle modulating the incident light; and a plurality of light deflecting sections which are arranged in an upper portion in a light emitting direction from said plurality of light source sections, each to allow the modulated light output from each of said light source sections to enter each of said plurality of mirror sections.

2. An apparatus according to claim 1, wherein a plurality of said light source sections are arranged for one of said plurality of mirror sections.

3. An apparatus according to claim 2, wherein the total number of said light source sections is an integer times (N) as large as the total number of said mirror sections and an arrangement period in which said (N) light source sections are set to one group is equal to the period interval (P) of said mirror sections.

4. An apparatus according to claim 3, wherein said plurality of light source sections are arranged in the direction perpendicular to a rotary axis of said mirror section.

5. An apparatus according to claim 1, wherein said plurality of light source sections have a light emitting structure for emitting the light in the direction along the light source arrangement surface and reflect said emitted light in the direction perpendicular to said light source arrangement surface by the reflecting surfaces.

6. An apparatus according to claim 1, wherein said plurality of light source sections have a light emitting structure for emitting the light in the direction perpendicular to the light source arrangement surface.

7. An apparatus according to claim 1, wherein said plurality of light source sections are semiconductor lasers.

8. An apparatus according to claim 1, wherein said plurality of light source sections are light emitting diodes.

9. An apparatus according to claim 1, wherein each of said plurality of mirror driving sections is a mirror driving device for generating an electrostatic attracting force (Coulomb's force) according to said external signal, thereby changing the direction of the reflecting surfaces of the mirror sections.

10. An apparatus according to claim 1, wherein said plurality of light deflecting sections are diffraction gratings.

11. An apparatus according to claim 10, wherein said plurality of diffraction gratings have a diffracting structure for converging the light to an observing position on an axial line passing through the center of the arrangement surface of said mirror sections.

12. An apparatus according to claim 10, wherein said plurality of diffraction gratings which have the same diffraction angle and are arranged in the vertical direction are realized by a single diffraction grating.

13. An apparatus according to claim 1, further comprising:
   a light source wiring section for supplying data signals and control signals to said plurality of light source sections;
   a light source driving circuit for outputting control signals for turning on/off the supplies of said data signals and data signals based on the 2-dimensional display image to said plurality of light source sections;
   a mirror wiring section for supplying mirror control signals to said plurality of mirror sections;
   a mirror driving circuit for outputting mirror control signals according to an observing direction of the 2-dimensional display image to said plurality of mirror sections; and
   a control section for forming said data signals, said control signals, and said mirror control signals.

14. An apparatus according to claim 13, wherein said control section controls in a manner such that a plurality of kinds of 2-dimensional images which are seen as different images depending on the observing position are sequentially displayed by the light emission driving of said light source sections, the lights emitted from said plurality of light source sections are deflected by said corresponding light deflecting sections synchronously with the displays of said 2-dimensional images, and after that, a group of light beams of the 2-dimensional images are deflected to the different observing positions by said mirror sections, thereby allowing the different 2-dimensional images to be seen depending on the observing position.

15. An apparatus according to claim 13, wherein said light source driving section supplies pixel signals and light source control signals in a lump to said plurality of light source sections arranged on the same line and displays a line, and
   said mirror driving circuit supplies the mirror control signals in a lump to said plurality of mirror sections arranged in the corresponding line synchronously with the line display of said light source driving circuit, thereby deflecting the light on a line unit basis.

16. An apparatus according to claim 1, wherein a light diffusing section for diffusing the light in one direction is further arranged at the front surfaces of said plurality of mirror sections.

17. An apparatus according to claim 16, wherein said light diffusing section is a lenticular sheet which is formed by arranging a plurality of micro lenticular lenses.

18. An apparatus according to claim 16, wherein said light diffusing section is a hologram.

19. A spatial light modulating apparatus which is used to display a stereoscopic image, comprising:
   a plurality of light source sections which are two-dimensionally arranged on an apparatus substrate at a predetermined period interval (P) set to satisfy $\tan^{-1}(P/L) \leq 0.3$ for a standard observation distance (L) from an observing position to a mirror surface, each to intensity modulate a light emitted by an image signal and then to output the modulated light thereby displaying a 2-dimensional image;
   a plurality of mirror sections having reflecting surfaces which are periodically arranged in correspondence to said plurality of light source sections, a direction of each of said reflecting surfaces being changeable; and
   a plurality of mirror driving sections which are arranged in correspondence to said plurality of mirror sections, each to control the change of direction of each of said reflecting surfaces by an external signal, thereby angle modulating the incident light.

20. An apparatus according to claim 19, wherein a plurality of said light source sections are arranged for one of said plurality of mirror sections.

21. An apparatus according to claim 20, wherein the total number of said light source sections is an integer times (N) as large as the total number of said mirror sections, and an arrangement period in which said (N) light source sections are set to one group is equal to the period interval (P) of said mirror sections.

22. An apparatus according to claim 21, wherein said plurality of light source sections are arranged in the direction perpendicular to a rotary axis of said mirror section.

23. An apparatus according to claim 19, wherein said plurality of light source sections have a light emitting structure for emitting the light in the direction along a light source arrangement surface and reflect said emitted light in the direction perpendicular to said light source arrangement surface.

24. An apparatus according to claim 19, wherein said plurality of light source sections have a light emitting structure for emitting the light in the direction perpendicular to a light source arrangement surface.

25. An apparatus according to claim 19, wherein said plurality of light source sections are semiconductor lasers.

26. An apparatus according to claim 19, wherein said plurality of light source sections are light emitting diodes.

27. An apparatus according to claim 19, wherein each of said plurality of mirror driving sections is a mirror driving device for generating an electrostatic attracting force (Coulomb's force) according to said external signal, thereby changing the direction of the reflecting surfaces of the mirror sections.

* * * * *

UNITED STATES PATENT AND TRADEMARK OFFICE
CERTIFICATE OF CORRECTION

PATENT NO. :     5,585,960
DATED      :     December 17, 1996
INVENTOR(S) :    Noriko SATO, et al.

It is certified that error appears in the above-indentified patent and that said Letters Patent is hereby corrected as shown below:

<u>Column 5</u>

Line 52, delete "predetermined period interval".

<u>Column 8</u>

Line 42, "8" should be --θ--.

Signed and Sealed this

Fourth Day of March, 1997

*Attest:*

BRUCE LEHMAN

*Attesting Officer*     Commissioner of Patents and Trademarks